(12) United States Patent
Cooper et al.

(10) Patent No.: US 10,464,579 B2
(45) Date of Patent: *Nov. 5, 2019

(54) SYSTEM AND METHOD FOR AUTOMATED ESTABLISHMENT OF A VEHICLE CONSIST

(71) Applicant: GENERAL ELECTRIC COMPANY, Schenectady, NY (US)

(72) Inventors: Jared Klineman Cooper, Melbourne, FL (US); Brian Joseph McManus, Fort Worth, TX (US); Frank Wawrzyniak, Melbourne, FL (US); Ralph Haddock, III, Melbourne, FL (US); Robert James Foy, Melbourne, FL (US); James Glen Corry, Melbourne, FL (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/836,063

(22) Filed: Aug. 26, 2015

(65) Prior Publication Data
US 2015/0360700 A1    Dec. 17, 2015

Related U.S. Application Data

(63) Continuation-in-part of application No. 14/275,297, filed on May 12, 2014, now Pat. No. 9,180,892.
(Continued)

(51) Int. Cl.
*B61L 3/00* (2006.01)
*B61C 17/12* (2006.01)
(Continued)

(52) U.S. Cl.
CPC .............. *B61C 17/12* (2013.01); *B60L 15/00* (2013.01); *B60L 15/32* (2013.01); *B60L 15/34* (2013.01);
(Continued)

(58) Field of Classification Search
CPC ..... B61C 17/12; B60T 17/228; B60T 13/665; B60L 15/00; B60L 15/34; B60L 15/38;
(Continued)

(56) References Cited

U.S. PATENT DOCUMENTS 2,738,659 A    3/1956  Heed
3,216,648 A    11/1965 Ford
(Continued)

FOREIGN PATENT DOCUMENTS

CN    1227918 A    9/1999
CN    2351587 Y    12/1999
(Continued)

OTHER PUBLICATIONS

Eurasian Search Report issued in connection with related EA Application No. 201591470 on Mar. 9, 2016.
(Continued)

*Primary Examiner* — Mary Cheung
(74) *Attorney, Agent, or Firm* — Christopher R. Carroll; The Small Patent Law Group LLC

(57) ABSTRACT

A method for controllably linking propulsion units in a vehicle consist includes transmitting a linking signal having an identity of a lead propulsion unit. A remote propulsion unit is remotely controlled by the lead unit when the identity matches a designated identity stored onboard the remote unit. A de-linking signal is transmitted from the lead unit when the lead unit is to be decoupled from the vehicle consist. The de-linking signal includes a replacement identity of a replacement propulsion unit. A replacement linking signal is transmitted from a second lead unit. The remote propulsion unit allows the second lead propulsion unit to remotely control the operations of the remote propulsion unit when replacement identity stored onboard the remote
(Continued)

propulsion unit matches an identity that is communicated in the replacement linking signal.

20 Claims, 11 Drawing Sheets

Related U.S. Application Data which is a continuation of application No. 13/593,258, filed on Aug. 23, 2012, now Pat. No. 8,725,323, which is a continuation-in-part of application No. 11/552,602, filed on Oct. 25, 2006, now Pat. No. 8,280,566, application No. 14/836,063, which is a continuation-in-part of application No. 14/741,229, filed on Jun. 16, 2015.

(60) Provisional application No. 60/792,428, filed on Apr. 17, 2006, provisional application No. 62/049,524, filed on Sep. 12, 2014.

(51) Int. Cl.
  *B60L 15/00*  (2006.01)
  *B60L 15/32*  (2006.01)
  *B60L 15/34*  (2006.01)
  *B60L 15/38*  (2006.01)
  *B60T 13/66*  (2006.01)
  *B60T 17/22*  (2006.01)

(52) U.S. Cl.
  CPC ............ *B60L 15/38* (2013.01); *B60T 13/665* (2013.01); *B60T 17/228* (2013.01); *B60L 2200/26* (2013.01); *Y02T 10/7258* (2013.01); *Y02T 90/16* (2013.01)

(58) Field of Classification Search
  CPC ...... B60L 15/32; B60L 2200/26; Y02T 90/16; Y02T 10/7258
  See application file for complete search history.

(56) References Cited

U.S. PATENT DOCUMENTS

| | | |
|---|---|---|
| 3,299,825 A | 1/1967 | Phiystein |
| 3,592,563 A | 7/1971 | Glass et al. |
| 3,778,761 A | 12/1973 | Cribbins |
| 3,855,509 A | 12/1974 | Wright |
| 4,112,703 A | 9/1978 | Kountz |
| 4,216,672 A | 8/1980 | Henry et al. |
| 4,216,915 A | 8/1980 | Hengartner et al. |
| 4,248,053 A | 2/1981 | Sisk |
| 4,334,427 A | 6/1982 | Armstrong |
| 4,653,986 A | 3/1987 | Ashton |
| 4,687,982 A | 8/1987 | Palaniappan |
| 4,689,602 A | 8/1987 | Morihara et al. |
| 4,793,047 A | 12/1988 | Curtis et al. |
| 5,000,664 A | 3/1991 | Lawless et al. |
| 5,106,270 A | 4/1992 | Goettel et al. |
| 5,112,196 A | 5/1992 | Schuh |
| 5,437,422 A | 8/1995 | Newman |
| 5,471,400 A | 11/1995 | Smalley et al. |
| 5,487,516 A | 1/1996 | Murata et al. |
| 5,546,015 A | 8/1996 | Okabe |
| 5,685,507 A | 11/1997 | Horst |
| 5,711,272 A | 1/1998 | Maegawa et al. |
| 5,728,941 A | 3/1998 | Yamamoto et al. |
| 5,738,311 A | 4/1998 | Fernandez |
| 5,777,547 A | 7/1998 | Waldrop |
| 5,785,081 A | 7/1998 | Krawczyk et al. |
| 5,817,934 A | 10/1998 | Skantar |
| 5,860,800 A | 1/1999 | Kramer et al. |
| 5,883,489 A | 3/1999 | Konrad |
| 5,885,060 A | 3/1999 | Cunkelman et al. |
| 5,897,597 A | 4/1999 | O'Daniel |
| 5,950,967 A | 9/1999 | Montgomery |
| 5,986,577 A | 11/1999 | Bezos |
| 5,986,579 A | 11/1999 | Halvorson |
| 6,023,651 A | 2/2000 | Nakayama et al. |
| 6,027,311 A | 2/2000 | Hill et al. |
| 6,036,456 A | 3/2000 | Peters et al. |
| 6,045,197 A | 4/2000 | McGaugh |
| 6,062,825 A | 5/2000 | Chovan |
| 6,081,769 A | 6/2000 | Curtis |
| 6,098,412 A | 8/2000 | Porter et al. |
| 6,132,012 A | 10/2000 | Ishii |
| 6,132,177 A | 10/2000 | Loprete et al. |
| 6,203,285 B1 | 3/2001 | Wagner et al. |
| 6,305,313 B1 | 10/2001 | Cunkelman et al. |
| 6,341,497 B2 | 1/2002 | Herrick et al. |
| 6,390,779 B1 | 5/2002 | Cunkelman |
| 6,456,937 B1 | 9/2002 | Doner et al. |
| 6,490,523 B2 | 12/2002 | Doner |
| 6,510,731 B2 | 1/2003 | Schricker et al. |
| 6,616,416 B1 | 9/2003 | Tolbert, Jr. |
| 6,651,034 B1 | 11/2003 | Hedlund et al. |
| 6,658,346 B2 | 12/2003 | Maegawa |
| 6,679,689 B2 | 1/2004 | Takahashi et al. |
| 6,680,918 B1 | 1/2004 | Haley |
| 6,758,147 B2 | 7/2004 | Howard et al. |
| 6,759,951 B2 | 7/2004 | Kellner et al. |
| 6,837,550 B2 | 1/2005 | Dougherty et al. |
| 6,862,502 B2 | 3/2005 | Peltz et al. |
| 6,922,619 B2 | 7/2005 | Baig et al. |
| 6,937,925 B2 | 8/2005 | Smith |
| 6,968,268 B2 | 11/2005 | Yamada et al. |
| 6,972,670 B2 | 12/2005 | Laduc et al. |
| 6,997,418 B1 | 2/2006 | Sanzone |
| 7,008,472 B2 | 3/2006 | Fornof et al. |
| 7,021,588 B2 | 4/2006 | Hess, Jr. et al. |
| 7,021,589 B2 | 4/2006 | Hess, Jr. et al. |
| 7,031,850 B2 | 4/2006 | Kambli et al. |
| 7,073,753 B2 | 7/2006 | Root et al. |
| 7,111,592 B1 | 9/2006 | Kern et al. |
| 7,124,057 B2 | 10/2006 | Foerster et al. |
| 7,133,766 B2 | 11/2006 | Kokubo |
| 7,153,106 B2 | 12/2006 | Cornwell |
| 7,177,732 B2 | 2/2007 | Kraeling et al. |
| 7,197,916 B2 | 4/2007 | Matsumoto et al. |
| 7,216,552 B2 | 5/2007 | Fogelstrom |
| 7,222,003 B2 | 5/2007 | Stull et al. |
| 7,302,895 B2 | 12/2007 | Kumar et al. |
| 7,309,929 B2 | 12/2007 | Donnelly et al. |
| 7,388,483 B2 | 6/2008 | Welles et al. |
| 7,395,141 B1 | 7/2008 | Seck et al. |
| 7,428,453 B2 | 9/2008 | Davenport et al. |
| 7,447,571 B2 | 11/2008 | Nickles et al. |
| 7,509,233 B2 | 3/2009 | Pervaiz |
| 7,522,990 B2 | 4/2009 | Daum et al. |
| 7,618,011 B2 | 11/2009 | Oleski et al. |
| 7,650,207 B2 | 1/2010 | Metzger |
| 7,715,956 B2 | 5/2010 | Bryant |
| 7,761,223 B2 | 7/2010 | Wang et al. |
| 7,983,805 B2 | 7/2011 | Bryant |
| 8,073,582 B2 | 12/2011 | Kellner et al. |
| 8,147,211 B2 | 4/2012 | Grant et al. |
| 8,190,314 B2 | 5/2012 | Smith et al. |
| 8,190,315 B2 | 5/2012 | Kraeling et al. |
| 8,364,338 B2 | 1/2013 | Peltonen et al. |
| 8,522,690 B2 | 9/2013 | Smith et al. |
| 8,696,335 B2 | 4/2014 | Fujimoto et al. |
| 8,961,147 B2 | 2/2015 | Van Campfort et al. |
| 9,109,517 B2 | 8/2015 | Banerjee et al. |
| 2002/0050271 A1 | 5/2002 | Hasegawa et al. |
| 2002/0051710 A1 | 5/2002 | Yoo et al. |
| 2002/0072833 A1 | 6/2002 | Gray |
| 2002/0159896 A1 | 10/2002 | Finnamore et al. |
| 2003/0077179 A1 | 4/2003 | Collins et al. |
| 2004/0079226 A1 | 4/2004 | Barrett |
| 2004/0120825 A1 | 6/2004 | Bouton et al. |
| 2004/0148926 A1 | 8/2004 | Morinaga et al. |
| 2004/0167738 A1 | 8/2004 | Miller |
| 2004/0193384 A1 | 9/2004 | Edlund et al. |

(56) References Cited

U.S. PATENT DOCUMENTS

| | | |
|---|---|---|
| 2004/0267450 A1 | 12/2004 | Kernwein |
| 2005/0204805 A1 | 9/2005 | Wakahara et al. |
| 2006/0033611 A1 | 2/2006 | Froitzheim |
| 2006/0222515 A1 | 10/2006 | DeLmotte et al. |
| 2006/0224309 A1 | 10/2006 | Schmidt et al. |
| 2007/0000308 A1 | 1/2007 | Weissgerber |
| 2007/0068181 A1 | 3/2007 | Kim |
| 2007/0241237 A1 | 10/2007 | Foy et al. |
| 2007/0253838 A1 | 11/2007 | Leiss |
| 2008/0022702 A1 | 1/2008 | Fijas et al. |
| 2008/0063551 A1 | 3/2008 | Cornwell |
| 2008/0065355 A1 | 3/2008 | Bredau et al. |
| 2008/0257532 A1 | 10/2008 | Fijas et al. |
| 2009/0076669 A1 | 3/2009 | Krishnaswamy et al. |
| 2009/0120174 A1 | 5/2009 | Nodera et al. |
| 2009/0229355 A1 | 9/2009 | Shoda |
| 2010/0106458 A1 | 4/2010 | Leu et al. |
| 2010/0147270 A1 | 6/2010 | Pursifull et al. |
| 2010/0153027 A1 | 6/2010 | Bredau et al. |
| 2010/0162797 A1 | 7/2010 | Summers et al. |
| 2010/0211296 A1 | 8/2010 | Saunders |
| 2010/0281843 A1 | 11/2010 | Smith |
| 2010/0303658 A1 | 12/2010 | Ito et al. |
| 2011/0046902 A1 | 2/2011 | Kyllingstad |
| 2011/0056708 A1 | 3/2011 | Gamble et al. |
| 2011/0213538 A1 | 9/2011 | Amann et al. |
| 2011/0320071 A1 | 12/2011 | Karg |
| 2012/0243375 A1 | 9/2012 | Melvin, II et al. |
| 2012/0317282 A1 | 12/2012 | Kraeling et al. |
| 2012/0321486 A1 | 12/2012 | Scarpinato et al. |
| 2014/0136031 A1 | 5/2014 | Burnett et al. |
| 2014/0188306 A1 | 7/2014 | Kumar et al. |
| 2014/0372498 A1 | 12/2014 | Mian et al. |

FOREIGN PATENT DOCUMENTS

| | | |
|---|---|---|
| CN | 1880936 A | 12/2006 |
| CN | 101061320 A | 10/2007 |
| CN | 101426665 A | 5/2009 |
| CN | 201358901 Y | 12/2009 |
| CN | 101654113 A | 2/2010 |
| CN | 201439746 U | 4/2010 |
| CN | 102292253 B | 12/2011 |
| CN | 102348589 A | 2/2012 |
| DE | 10052664 A1 | 5/2002 |
| DE | 102007039793 A1 | 2/2009 |
| EP | 0522849 A1 | 1/1993 |
| EP | 1253059 A1 | 10/2002 |
| EP | 1947341 A1 | 7/2008 |
| EP | 2236863 B1 | 11/2012 |
| GB | 658118 A | 10/1951 |
| JP | 2003021072 A | 1/2003 |
| KR | 100779192 B1 | 11/2007 |
| RU | 32457 U1 | 9/2003 |
| RU | 2238860 C1 | 10/2004 |
| RU | 2519793 C1 | 6/2014 |
| SU | 498189 A1 | 1/1976 |
| WO | 2007084140 A1 | 7/2007 |
| WO | 2009120521 A1 | 10/2009 |
| WO | 2014004003 A2 | 1/2014 |

OTHER PUBLICATIONS

PCT Search Report and Written Opinion issued in connection with related Application No. PCT/US2007066011 on Oct. 2, 2007.

PCT Search Report and Written Opinion issued in connection with related Application No. PCT/US2007066011 on Nov. 24, 2008.

US Office Action issued in connection with related U.S. Appl. No. 11/552,602 on Mar. 26, 2010.

Unofficial English Translation of Chinese Office Action issued in connection with related CN Application No. 200780013958.2 on Jul. 22, 2010.

US Office Action issued in connection with corresponding U.S. Appl. No. 11/552,602 on Oct. 27, 2010.

Unofficial English Translation of Russian Office Action issued in connection with related RU Application No. 2008145039 on Feb. 1, 2011.

Unofficial English Translation of Mexican Office Action issued in connection with related MX Application No. MX/a/2008/013043 on Jun. 16, 2011.

Unofficial English Translation of Chinese Office Action issued in connection with related CN Application No. 200780013958.2 on Jul. 8, 2011.

Unofficial English Translation of Russian Office Action issued in connection with related RU Application No. 2008145039 on Apr. 13, 2012.

Australian Examination Report issued in connection with related AU Application No. 2007238317 on Dec. 7, 2012.

Canadian Office Action issued in connection with related CA Application No. 2648296 on Feb. 25, 2013.

Unofficial English Translation of Chinese Office Action issued in connection with corresponding CN Application No. 201310373253.9 on Feb. 14, 2016.

Lynch et al., "Acoustical Oceanography and Underwater Acoustics: Acoustical Measurement of Coastal Ocean Processes I", Journal of the Acoustical Society of America, vol. No. 101, Issue No. 5, pp. 3015-3048, May 1997.

"Bearing Failure Detection on an Air Compressor Case History", DLI Engineering, Literature Number CH-4, Retrieved from http://www.termogram.com/articulos/doc_download/3-case-study-azimadli-compresor-de-aire, on Jan. 12, 2010.

PCT Search Report and Written Opinion issued in connection with related PCT Application No. PCT/US2012/053520 dated Dec. 17, 2012.

PCT International Preliminary Report on Patentability issued in connection with related PCT Application No. PCT/US2012/053520 dated Mar. 27, 2014.

U.S. Non-Final Office Action issued in connection with related U.S. Appl. No. 13/233,856 dated Apr. 8, 2014.

PCT Search Report and Written Opinion issued in connection with related PCT Application No. PCT/US2013/036527 dated Aug. 25, 2014.

PCT Search Report and Written Opinion issued in connection with related PCT Application No. PCT/US2013/037567 dated Aug. 25, 2014.

U.S. Non-Final Office Action issued in connection with related U.S. Appl. No. 13/741,649 dated Oct. 20, 2014.

U.S. Final Office Action issued in connection with related U.S. Appl. No. 13/233,856 dated Oct. 21, 2014.

PCT International Preliminary Report on Patentability issued in connection with related PCT Application No. PCT/US2013/036527 dated Oct. 30, 2014.

PCT International Preliminary Report on Patentability issued in connection with related PCT Application No. PCT/US2013/037567 dated Oct. 30, 2014.

U.S. Notice of Allowance issued in connection with related U.S. Appl. No. 13/233,856 dated Nov. 21, 2014.

U.S. Non-Final Office Action issued in connection with related U.S. Appl. No. 13/866,435 dated Mar. 26, 2015.

U.S. Non-Final Office Action issued in connection with related U.S. Appl. No. 13/857,334 dated Apr. 10, 2015.

Chinese Office Action issued in connection with related CN Application No. 201280044852.X dated Apr. 22, 2015.

U.S. Notice of Allowance issued in connection with related U.S. Appl. No. 13/741,649 dated Apr. 24, 2015.

U.S. Non-Final Office Action issued in connection with related U.S. Appl. No. 13/866,573 dated May 7, 2015.

U.S. Non-Final Office Action issued in connection with related U.S. Appl. No. 13/866,670 dated May 22, 2015.

Eurasian Office Action issued in connection with related EA Application No. 201490351 dated Sep. 17, 2015.

U.S. Final Office Action issued in connection with related U.S. Appl. No. 13/866,435 dated Oct. 30, 2015.

U.S. Final Office Action issued in connection with related U.S. Appl. No. 13/866,670 dated Dec. 17, 2015.

(56) References Cited

OTHER PUBLICATIONS

U.S. Final Office Action issued in connection with related U.S. Appl. No. 13/866,573 dated Dec. 31, 2015.
U.S. Final Office Action issued in connection with related U.S. Appl. No. 13/857,334 dated Jan. 14, 2016.
Chinese Office Action issued in connection with related CN Application No. 201380032394.2 dated Feb. 2, 2016.
U.S. Non-Final Office Action issued in connection with related U.S. Appl. No. 13/866,471 dated Mar. 24, 2016.
U.S. Non-Final Office Action issued in connection with related U.S. Appl. No. 14/803,089 dated Apr. 8, 2016.
U.S. Non-Final Office Action issued in connection with related U.S. Appl. No. 14/520,585 dated Apr. 13, 2016.
Australian Examination Report issued in connection with related AU Application No. 2013248977 dated Apr. 20, 2016.
U.S. Non-Final Office Action issued in connection with related U.S. Appl. No. 13/866,435 dated Apr. 22, 2016.
U.S. Non-Final Office Action issued in connection with related U.S. Appl. No. 13/866,573 dated Jun. 3, 2016.
Australian Examination Report issued in connection with related AU Application No. 2015243113 dated Jun. 28, 2016.
U.S. Non-Final Office Action issued in connection with related U.S. Appl. No. 13/866,499 dated Jul. 14, 2016.
U.S. Non-Final Office Action issued in connection with related U.S. Appl. No. 13/956,426 dated Jul. 27, 2016.
U.S. Non-Final Office Action issued in connection with related U.S. Appl. No. 13/866,471 dated Sep. 23, 2016.
U.S. Final Office Action issued in connection with related U.S. Appl. No. 14/803,089 dated Oct. 21, 2016.
U.S. Final Office Action issued in connection with related U.S. Appl. No. 13/866,435 dated Nov. 3, 2016.
U.S. Non-Final Office Action issued in connection with related U.S. Appl. No. 13/866,573 dated Dec. 15, 2016.
U.S. Final Office Action issued in connection with related U.S. Appl. No. 13/956,426 dated Dec. 15, 2016.
Australian Notice of Acceptance issued in connection with related AU Application No. 2013248977 dated Dec. 22, 2016.
U.S. Non-Final Office Action issued in connection with related U.S. Appl. No. 13/866,499 dated Jan. 27, 2017.
Australian Examination Report issued in connection with corresponding AU Application No. 2013211559 dated Feb. 10, 2017.
Australian Notice of Acceptance issued in connection with related AU Application No. 2015243113 dated Apr. 18, 2017.
U.S. Notice of Allowance issued in connection with related U.S. Appl. No. 13/866,471 dated May 8, 2017.
U.S. Non-Final Office Action issued in connection with related U.S. Appl. No. 13/956,426 dated May 17, 2017.
Examination report for AU 2018200951, dated Jan. 9, 2019, 6 pages.

SYSTEM AND METHOD FOR AUTOMATED ESTABLISHMENT OF A VEHICLE CONSIST

CROSS-REFERENCE TO RELATED APPLICATIONS

This application is a continuation-in-part of U.S. patent application Ser. No. 14/275,297, filed on 12 May 2014 (the "'297 Application"), which is a continuation of U.S. patent application Ser. No. 13/593,258, filed on 23 Aug. 2012 (the "'258 Application"). The '258 Application issued as U.S. Pat. No. 8,725,323 on 13 May 2014. The '258 Application is a continuation-in-part of U.S. patent application Ser. No. 11/552,602, filed on 25 Oct. 2006 (the "'602 Application"), which issued as U.S. Pat. No. 8,280,566 on 2 Oct. 2012. The '602 Application claims priority to U.S. Provisional Application No. 60/792,428, filed on 17 Apr. 2006 (the "'428 Application").

This application also is a continuation-in-part of U.S. patent application Ser. No. 14/741,229, filed 16 Jun. 2015 (the "'229 Application"), which claims priority to U.S. Provisional Application No. 62/049,524, which filed on 12 Sep. 2014 (the "'524 Application").

The entire disclosures of these applications (the '297 Application, the '258 Application, the '602 Application, the '229 Application, and the '524 Application) are incorporated herein by reference.

FIELD

Embodiments of the subject matter described herein relate to operations of a vehicle system. Other embodiments relate to establishing distributed power operations of a vehicle consist.

BACKGROUND

Some vehicle consists include several powered vehicles that generate tractive effort for propelling the vehicle consists along a route. For example, trains may have several locomotives coupled with each other that propel the train along a track. The locomotives may communicate with each other in order to coordinate the tractive efforts and/or braking efforts provided by the locomotives. As one example, locomotives may be provided in a distributed power (DP) arrangement with one locomotive designated as a lead locomotive and other locomotives designated as remote locomotives. The lead locomotive may direct the tractive and braking efforts provided by the remote locomotives during a trip of the consist.

Some known consists use wireless communication between the locomotives for coordinating the tractive and/or braking efforts. For example, a lead locomotive can issue commands to the remote locomotives. The remote locomotives receive the commands and implement the tractive efforts and/or braking efforts directed by the commands. In order to ensure that the remote locomotives receive the commands, the lead locomotive may periodically re-communicate the commands until all of the remote locomotives confirm receipt of the commands by communicating a confirmation message to the lead locomotive.

In order to set up the consists to wirelessly communicate in this manner, an operator typically travels to and boards each individual remote locomotive in turn. While onboard each remote locomotive, the operator enters a road number of the lead locomotive and an orientation of the remote locomotive relative to the lead locomotive in order to link the remote locomotive with the lead locomotive. This process is time consuming and prone to human error.

Trains with distributed power systems can be operated in different modes. One mode is where all locomotives in the train operate at the same notch command. For example, if a lead locomotive is commanding motoring at notch 8 ("N8"), all units in the train will be commanded to generate motoring at N8 power. Another mode of operation is "independent" control. In this mode, locomotives or sets of locomotives distributed throughout the train can be operated at different motoring or braking powers. For example, as a train crests a mountaintop, the lead locomotives (on the down slope of mountain) may be placed in braking, while the locomotives in the middle or at the end of the train (on the up slope of mountain) may be in motoring. This is done to minimize tensile forces on the mechanical couplers that connect the railcars and locomotives.

When operating in distributed power, an operator, usually located in the lead locomotive, can control operating functions of remote locomotives in the remote consists via a control system, such as a distributed power control element. Thus, when operating in distributed power, the operator can command each locomotive consist to operate at a different notch power level (or one consist could be in motoring and other could be in braking), or each individual locomotive in the locomotive consist operates at the same notch power.

Currently, a train having locomotives that may operate in distributed power are set up manually, usually at a rail yard. Operators must physically enter each locomotive to enter data into the distributed power system aboard the locomotive to enable "linking" of the locomotives so that distributed power operations may commence. For example, suppose locomotives are included in a train where the locomotives may be facing different directions, meaning that some may be facing forward whereas others may be facing backward. The operator must physically enter each locomotive and select the direction the locomotive should motor. The operator must also initiate and attempt to complete the linking process prior to any unforeseen problems with equipment or systems in the train being detected. Train operators and owners may realize a financial savings and reduction in manpower from remotely setting up, linking, and testing distributed power operations of a train.

Additionally, if the lead locomotive experiences one or more faults (e.g., in communication with the other locomotives that are linked with the lead locomotive in a distributed power arrangement), the lead locomotive may need to be decoupled from the train and replaced with another lead locomotive. In order to do this, the replacement lead locomotive is coupled to the train and an operator may need to manually enter each remote locomotive along the length of the train to manually input the change in lead locomotive into control systems of the remote locomotives so that these control systems know to receive commands from the replacement lead locomotive, and not the previous lead locomotive that has been removed. For relatively long trains and/or trains having several remote locomotives, this process can consume a significant amount of time.

BRIEF DESCRIPTION

Embodiments of the inventive subject matter are directed toward a system, method, and a computer software code for remotely establishing distributed power operations of a vehicle consist, such as a train. For example, one embodiment relates to a system for establishing distributed power operations of a vehicle consist (e.g., such as, but not limited to, a locomotive consist) from a single location in the vehicle consist. The vehicle consist may have a lead propulsion unit (e.g., such as, but not limited to, a locomotive) and/or a remote propulsion unit, with a distributed power system on each propulsion unit. The system includes a communication network providing communications within the vehicle consist, and at least one distributed power setup unit in communication with the propulsion units by way of the communication network. The distributed power setup unit has a processor, display, and/or an input device to allow a user to establish distributed power operations, or it may work autonomously. In one embodiment, a method (e.g., for controllably linking propulsion units, or propulsion units, in a vehicle consist) includes transmitting a linking signal from a first lead propulsion unit of a vehicle consist to a remote propulsion unit of the vehicle consist. The linking signal includes a first identity of the first lead propulsion unit. The remote propulsion unit and the first lead propulsion unit are controllably linked with each other when the first identity of the first lead propulsion unit in the linking signal corresponds to a designated identity that is stored onboard the remote propulsion unit. The remote propulsion unit allows the first lead propulsion unit to remotely control operations of the remote propulsion unit when the first lead propulsion unit and the remote propulsion unit are controllably linked. The method also includes transmitting a de-linking signal from the first lead propulsion unit to the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The method further includes transmitting a replacement linking signal from a second lead propulsion unit to the remote propulsion unit. The replacement linking signal includes a second identity of the second lead propulsion unit. The remote propulsion unit and the second lead propulsion unit are controllably linked when the second identity of the second lead propulsion unit corresponds to the replacement identity received at the remote propulsion unit. The remote propulsion unit allows the second lead propulsion unit to remotely control the operations of the remote propulsion unit when the second lead propulsion unit and the remote propulsion unit are controllably linked.

In one embodiment, method (e.g., for controllably linking a remote propulsion unit with a lead propulsion unit in a vehicle consist) includes receiving a linking signal from a first lead propulsion unit of a vehicle consist at a remote propulsion unit of the vehicle consist. The linking signal includes a first identity of the first lead propulsion unit. The method also includes transmitting a first confirmation signal from the remote propulsion unit to the first lead propulsion unit to controllably link the remote propulsion unit with the first lead propulsion unit. The first confirmation signal is transmitted when the first identity of the first lead propulsion unit in the linking signal corresponds to a designated identity that is stored onboard the remote propulsion unit. The remote propulsion unit allows the first lead propulsion unit to remotely control operations of the remote propulsion unit when the first lead propulsion unit and the remote propulsion unit are controllably linked.

The method further includes receiving a de-linking signal from the first lead propulsion unit at the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The method also includes receiving a replacement linking signal from a second lead propulsion unit at the remote propulsion unit, the replacement linking signal including a second identity of the second lead propulsion unit, and transmitting a second confirmation signal from the remote propulsion unit to the second lead propulsion unit to controllably link the remote propulsion unit with the second lead propulsion unit, the second confirmation signal transmitted when the second identity of the second lead propulsion unit corresponds to the replacement identity in the de-linking signal that is received at the remote propulsion unit. The remote propulsion unit allows the second lead propulsion unit to remotely control the operations of the remote propulsion unit when the second lead propulsion unit and the remote propulsion unit are controllably linked.

In one embodiment, a method (e.g., for de-linking a lead propulsion unit from a remote propulsion unit in a vehicle consist) includes, in the vehicle consist having plural propulsion units configured to propel the vehicle consist, transmitting a linking signal from a lead propulsion unit of the propulsion units to a remote propulsion unit of the propulsion units, the linking signal including a first identity of the lead propulsion unit. The method also includes controllably linking the remote propulsion unit with the lead propulsion unit when the first identity of the lead propulsion unit in the linking signal corresponds to a designated identity that is stored onboard the remote propulsion unit. The remote propulsion unit allows the lead propulsion unit to remotely control operations of the remote propulsion unit when the lead propulsion unit and the remote propulsion unit are controllably linked. The method further includes transmitting a de-linking signal from the lead propulsion unit to the remote propulsion unit when the lead propulsion unit is to be mechanically decoupled from the vehicle consist. The de-linking signal includes a replacement identity of a propulsion unit other than the lead propulsion unit that is to be mechanically coupled to the vehicle consist to replace the lead propulsion unit. The replacement identity is transmitted to the remote propulsion unit to permit the remote propulsion unit to verify which of the propulsion units in the vehicle consist can (i.e., is designated to) remotely control operations of the remote propulsion unit.

In one embodiment, a system (e.g., a communication system of a vehicle consist) includes first, second, and third communication interfaces and a setup device. The first communication interface is configured to be disposed onboard a first lead propulsion unit of a vehicle consist. The first communication interface is configured to transmit a linking signal from the first lead propulsion unit to a remote propulsion unit of the vehicle consist. The linking signal includes a first identity of the first lead propulsion unit. The second communication interface is configured to be disposed onboard the remote propulsion unit and to receive the linking signal from the first lead propulsion unit. The setup unit is configured to be disposed onboard the remote propulsion unit and to direct the second communication interface to controllably link with the first communication interface of the first lead propulsion unit when the first identity of the first lead propulsion unit in the linking signal corresponds to a designated identity that is stored onboard the remote propulsion unit.

The setup unit allows the remote propulsion unit to be remotely controlled by the first lead propulsion unit when the first and second communication interfaces are controllably linked. The first communication interface is configured to transmit a de-linking signal from the first lead propulsion unit to the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit.

The third communication interface is configured to be disposed onboard a second lead propulsion unit of the vehicle consist. The third communication interface is configured to transmit a replacement linking signal to the remote propulsion unit that includes a second identity of the second lead propulsion unit. The setup unit is configured to controllably link the remote propulsion unit with the second lead propulsion unit when the second identity of the second lead propulsion unit corresponds to the replacement identity in the de-linking signal that is received at the remote propulsion unit. The setup unit also is configured to allow the second lead propulsion unit to remotely control operations of the remote propulsion unit when the second lead propulsion unit and the remote propulsion unit are controllably linked.

In one embodiment, a system (e.g., a communication system of a remote propulsion unit in a vehicle consist) includes a communication interface and a setup unit. The communication interface is configured to be disposed onboard a remote propulsion unit of a vehicle consist and to receive a linking signal from a first lead propulsion unit of the vehicle consist that includes a first identity of the first lead propulsion unit. The setup unit is configured to be disposed onboard the remote propulsion unit and to controllably link the remote propulsion unit with the first lead propulsion unit when the first identity of the first lead propulsion unit in the linking signal corresponds to a designated identity that is stored onboard the remote propulsion unit. The setup unit is configured to allow the first lead propulsion unit to remotely control operations of the remote propulsion unit when the first lead propulsion unit and the remote propulsion unit are controllably linked. In one aspect, the setup unit can prevent the first lead propulsion unit from remotely controlling operations of the remote propulsion unit when the remote propulsion unit is not controllably linked with the first lead propulsion unit.

The communication interface is configured to receive a de-linking signal from the first lead propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The communication interface also is configured to receive a replacement linking signal from a second lead propulsion unit at the remote propulsion unit, the replacement linking signal including a second identity of the second lead propulsion unit. The setup unit is further configured to allow the remote propulsion unit to be controlled by the second lead propulsion unit when the second identity of the second lead propulsion unit corresponds to the replacement identity in the de-linking signal that is received at the remote propulsion unit.

In one embodiment, a system (e.g., a communication system of a lead propulsion unit in a vehicle consist) includes a communication interface that is configured to be disposed onboard the lead propulsion unit of the vehicle consist having plural propulsion units configured to propel the vehicle consist. The communication interface is configured to transmit transmitting a linking signal to a remote propulsion unit of the propulsion units, the linking signal including a first identity of the lead propulsion unit. A setup unit that is onboard the remote propulsion unit controllably links the remote propulsion unit with the lead propulsion unit when the first identity of the lead propulsion unit in the linking signal corresponds to a designated identity that is stored onboard the remote propulsion unit. The remote propulsion unit allows the lead propulsion unit to remotely control operations of the remote propulsion unit when the lead propulsion unit and the remote propulsion unit are controllably linked.

The communication interface also is configured to transmit a de-linking signal to the remote propulsion unit when the lead propulsion unit is to be mechanically decoupled from the vehicle consist. The de-linking signal including a replacement identity of a propulsion unit other than the lead propulsion unit that is to be mechanically coupled to the vehicle consist to replace the lead propulsion unit. The replacement identity is transmitted to the remote propulsion unit to permit the remote propulsion unit to verify which of the propulsion units in the vehicle consist can (i.e., is designated to) remotely control operations of the remote propulsion unit.

In one embodiment, a method (e.g., for controllably linking propulsion units, or propulsion units, in a vehicle consist) includes transmitting a linking signal from a first lead propulsion unit of a vehicle consist to a remote propulsion unit of the vehicle consist. The linking signal includes a first identity of the first lead propulsion unit. The remote propulsion unit and the first lead propulsion unit are controllably linked with each other when the first identity of the first lead propulsion unit in the linking signal corresponds to a designated identity that is stored onboard the remote propulsion unit. The remote propulsion unit allows the first lead propulsion unit to remotely control operations of the remote propulsion unit when the first lead propulsion unit and the remote propulsion unit are controllably linked. The method also includes transmitting a de-linking signal from the first lead propulsion unit to the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The method further includes transmitting a replacement linking signal from a second lead propulsion unit to the remote propulsion unit. The replacement linking signal includes a second identity of the second lead propulsion unit. The remote propulsion unit and the second lead propulsion unit are controllably linked when the second identity of the second lead propulsion unit corresponds to the replacement identity received at the remote propulsion unit. The remote propulsion unit allows the second lead propulsion unit to remotely control the operations of the remote propulsion unit when the second lead propulsion unit and the remote propulsion unit are controllably linked.

In one embodiment, method (e.g., for controllably linking a remote propulsion unit with a lead propulsion unit in a vehicle consist) includes receiving a linking signal from a first lead propulsion unit of a vehicle consist at a remote propulsion unit of the vehicle consist. The linking signal includes a first identity of the first lead propulsion unit. The method also includes transmitting a first confirmation signal from the remote propulsion unit to the first lead propulsion unit to controllably link the remote propulsion unit with the first lead propulsion unit. The first confirmation signal is transmitted when the first identity of the first lead propulsion unit in the linking signal corresponds to a designated identity that is stored onboard the remote propulsion unit. The remote propulsion unit allows the first lead propulsion unit to remotely control operations of the remote propulsion unit when the first lead propulsion unit and the remote propulsion unit are controllably linked.

The method further includes receiving a de-linking signal from the first lead propulsion unit at the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The method also includes receiving a replacement linking signal from a second lead propulsion unit at the remote propulsion unit, the replacement linking signal including a second identity of the second lead propulsion unit, and transmitting a second confirmation signal from the remote propulsion unit to the second lead propulsion unit to controllably link the remote propulsion unit with the second lead propulsion unit, the second confirmation signal transmitted when the second identity of the second lead propulsion unit corresponds to the replacement identity in the de-linking signal that is received at the remote propulsion unit. The remote propulsion unit allows the second lead propulsion unit to remotely control the operations of the remote propulsion unit when the second lead propulsion unit and the remote propulsion unit are controllably linked.

In one embodiment, a method (e.g., for de-linking a lead propulsion unit from a remote propulsion unit in a vehicle consist) includes, in the vehicle consist having plural propulsion units configured to propel the vehicle consist, transmitting a linking signal from a lead propulsion unit of the propulsion units to a remote propulsion unit of the propulsion units, the linking signal including a first identity of the lead propulsion unit. The method also includes controllably linking the remote propulsion unit with the lead propulsion unit when the first identity of the lead propulsion unit in the linking signal corresponds to a designated identity that is stored onboard the remote propulsion unit. The remote propulsion unit allows the lead propulsion unit to remotely control operations of the remote propulsion unit when the lead propulsion unit and the remote propulsion unit are controllably linked. The method further includes transmitting a de-linking signal from the lead propulsion unit to the remote propulsion unit when the lead propulsion unit is to be mechanically decoupled from the vehicle consist. The de-linking signal includes a replacement identity of a propulsion unit other than the lead propulsion unit that is to be mechanically coupled to the vehicle consist to replace the lead propulsion unit. The replacement identity is transmitted to the remote propulsion unit to permit the remote propulsion unit to verify which of the propulsion units in the vehicle consist can (i.e., is designated to) remotely control operations of the remote propulsion unit.

In one embodiment, a system (e.g., a communication system of a vehicle consist) includes first, second, and third communication interfaces and a setup device. The first communication interface is configured to be disposed onboard a first lead propulsion unit of a vehicle consist. The first communication interface is configured to transmit a linking signal from the first lead propulsion unit to a remote propulsion unit of the vehicle consist. The linking signal includes a first identity of the first lead propulsion unit. The second communication interface is configured to be disposed onboard the remote propulsion unit and to receive the linking signal from the first lead propulsion unit. The setup unit is configured to be disposed onboard the remote propulsion unit and to direct the second communication interface to controllably link with the first communication interface of the first lead propulsion unit when the first identity of the first lead propulsion unit in the linking signal corresponds to a designated identity that is stored onboard the remote propulsion unit.

The setup unit allows the remote propulsion unit to be remotely controlled by the first lead propulsion unit when the first and second communication interfaces are controllably linked. The first communication interface is configured to transmit a de-linking signal from the first lead propulsion unit to the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit.

The third communication interface is configured to be disposed onboard a second lead propulsion unit of the vehicle consist. The third communication interface is configured to transmit a replacement linking signal to the remote propulsion unit that includes a second identity of the second lead propulsion unit. The setup unit is configured to controllably link the remote propulsion unit with the second lead propulsion unit when the second identity of the second lead propulsion unit corresponds to the replacement identity in the de-linking signal that is received at the remote propulsion unit. The setup unit also is configured to allow the second lead propulsion unit to remotely control operations of the remote propulsion unit when the second lead propulsion unit and the remote propulsion unit are controllably linked.

In one embodiment, a system (e.g., a communication system of a remote propulsion unit in a vehicle consist) includes a communication interface and a setup unit. The communication interface is configured to be disposed onboard a remote propulsion unit of a vehicle consist and to receive a linking signal from a first lead propulsion unit of the vehicle consist that includes a first identity of the first lead propulsion unit. The setup unit is configured to be disposed onboard the remote propulsion unit and to controllably link the remote propulsion unit with the first lead propulsion unit when the first identity of the first lead propulsion unit in the linking signal corresponds to a designated identity that is stored onboard the remote propulsion unit. The setup unit allows the first lead propulsion unit to remotely control operations of the remote propulsion unit when the first lead propulsion unit and the remote propulsion unit are controllably linked. In one aspect, the setup unit can prevent the first lead propulsion unit from remotely controlling operations of the remote propulsion unit when the remote propulsion unit is not controllably linked with the first lead propulsion unit.

The communication interface is configured to receive a de-linking signal from the first lead propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The communication interface also is configured to receive a replacement linking signal from a second lead propulsion unit at the remote propulsion unit, the replacement linking signal including a second identity of the second lead propulsion unit. The setup unit is further configured to allow the remote propulsion unit to be controlled by the second lead propulsion unit when the second identity of the second lead propulsion unit corresponds to the replacement identity in the de-linking signal that is received at the remote propulsion unit.

In one embodiment, a system (e.g., a communication system of a lead propulsion unit in a vehicle consist) includes a communication interface that is configured to be disposed onboard the lead propulsion unit of the vehicle consist having plural propulsion units configured to propel the vehicle consist. The communication interface is configured to transmit transmitting a linking signal to a remote propulsion unit of the propulsion units, the linking signal including a first identity of the lead propulsion unit. A setup unit that is onboard the remote propulsion unit controllably links the remote propulsion unit with the lead propulsion unit when the first identity of the lead propulsion unit in the linking signal corresponds to a designated identity that is stored onboard the remote propulsion unit. The remote propulsion unit allows the lead propulsion unit to remotely control operations of the remote propulsion unit when the lead propulsion unit and the remote propulsion unit are controllably linked.

In another embodiment, a system (e.g., for controllably linking propulsion units) includes a control unit having a first communication interface and a first setup unit operably coupled with the first communication interface. The control unit is configured to be disposed onboard a first propulsion unit of a vehicle consist. The control unit is configured to operate in at least a first mode of operation, a different, second mode of operation, and a different, third mode of operation. When in the first mode of operation, the control unit is configured to transmit a first linking signal to a second propulsion unit in the vehicle consist. The first linking signal includes a first identity of the first propulsion unit for the first propulsion unit to control the second propulsion unit if the first identity corresponds to a first designated identity that is stored onboard the second propulsion unit. When in the second mode of operation, the control unit is configured to transmit a first de-linking signal to the second propulsion unit when the first propulsion unit is to be mechanically decoupled from the vehicle consist. The first de-linking signal includes a first replacement identity of a third propulsion unit that is to be mechanically coupled to the vehicle consist to replace the first propulsion unit, for the third propulsion unit to control the second propulsion unit if a second identity received by the second propulsion unit from the third propulsion unit in a second linking signal matches the first replacement identity. When in the third mode of operation, the control unit is configured to receive a third linking signal from the second propulsion unit, a second de-linking signal from the second propulsion unit, or a fourth linking signal from the third propulsion unit. When in the third mode of operation, the control unit also is configured to allow the second propulsion unit to control the first propulsion unit if a third identity in the third linking signal corresponds to a second designated identity stored onboard the first propulsion unit, or to allow the third propulsion unit to control the first propulsion unit if a fourth identity in the fourth linking signal corresponds to a second replacement identity received in the second de-linking signal from the second propulsion unit.

In one embodiment, a method (e.g., for establishing a communication link between vehicles) includes receiving a link command message at a first remote vehicle in a vehicle consist having a lead vehicle and at least the first remote vehicle. The link command message includes identifying information representative of at least one of a designated vehicle consist or one or more designated remote vehicles. The method also includes comparing, onboard the first remote vehicle, the identifying information of the link command message with one or more of a stored consist identifier or a stored vehicle identifier stored onboard the first remote vehicle, and establishing a communication link between the lead vehicle and the first remote vehicle responsive to the identifying information of the link command message matching the one or more of the stored consist identifier or the stored vehicle identifier.

In another embodiment, a system (e.g., a communication system onboard a vehicle) includes a remote communication unit and a control unit. The remote communication unit is configured to receive a link command message at a first remote vehicle in a vehicle consist having a lead vehicle and at least the first remote vehicle. The link command message includes identifying information representative of at least one of a designated vehicle consist or one or more designated remote vehicles. The control unit is configured to be disposed onboard the first remote vehicle and to compare the identifying information of the link command message with one or more of a stored consist identifier or a stored vehicle identifier stored onboard the first remote vehicle. The control unit also configured to establish a communication link between the lead vehicle and the first remote vehicle responsive to the identifying information of the link command message matching the one or more of the stored consist identifier or the stored vehicle identifier.

In another embodiment, another method (e.g., for establishing a communication link between vehicles) includes obtaining a lead vehicle identifier onboard a remote vehicle in a vehicle consist having a first lead vehicle and at least the remote vehicle, receiving a link command message at the remote vehicle, the link command message including identifying information representative of a designated lead vehicle, comparing, onboard the remote vehicle, the identifying information of the link command message with the lead vehicle identifier, and establishing a communication link between the first lead vehicle and the remote vehicle responsive to the identifying information of the link command message matching the lead vehicle identifier.

In another embodiment, a system (e.g., a communication system onboard a vehicle) includes a control unit and a remote communication unit. The control unit is configured to be disposed onboard a remote vehicle in a vehicle consist having a first lead vehicle and at least the remote vehicle. The control unit also is configured to obtain a lead vehicle identifier representative of the first lead vehicle. The remote communication unit is configured to be disposed onboard the remote vehicle and to receive a link command message that includes identifying information representative of a designated lead vehicle. The control unit is configured to compare the identifying information of the link command message with the lead vehicle identifier and to establish a communication link between the first lead vehicle and the remote vehicle responsive to the identifying information of the link command message matching the lead vehicle identifier.

In another embodiment, a system (e.g., a communication system) includes a communication unit and a control unit. The communication unit can be configured to be disposed on one of onboard a lead vehicle of a vehicle consist having the lead vehicle and plural remote vehicles or off-board the vehicle consist. The control unit can be configured to be disposed on said one of onboard the lead vehicle or off-board the vehicle consist and to control the communication unit to transmit plural link command messages to the plural remote vehicles. Each of the link command messages can include identifying information representative of at least one of a designated vehicle consist and/or one or more designated remote vehicles. The control unit also can be configured to automatically establish one or more communication links with the remote vehicles responsive to the identifying information in the link command messages matching one or more of a stored consist identifier and/or a stored vehicle identifier stored onboard the remote vehicles.

BRIEF DESCRIPTION OF THE DRAWINGS

A more particular description of embodiments of the inventive subject matter briefly described above will be rendered by reference to specific embodiments thereof that are illustrated in the appended drawings. Understanding that these drawings depict only typical embodiments of the inventive subject matter and are not therefore to be considered to be limiting of its scope, embodiments of the inventive subject matter will be described and explained with additional specificity and detail through the use of the accompanying drawings in which.

DETAILED DESCRIPTION

Figure 1:
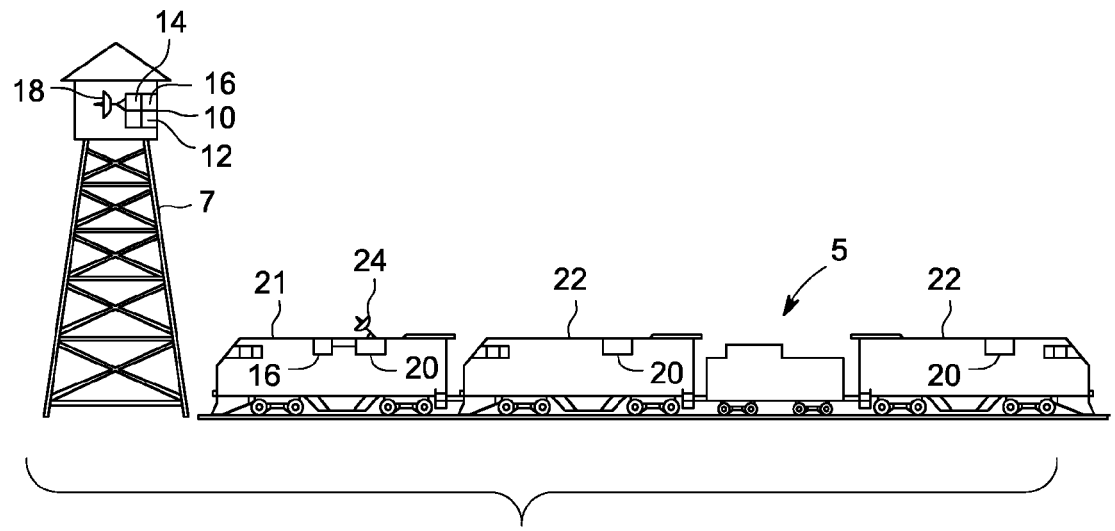
FIG. 1 depicts an embodiment of a system for remotely setting up, linking, and testing distributed power operations of a vehicle system, such as a vehicle consist.

Reference will now be made in detail to embodiments of the inventive subject matter, examples of which are illustrated in the accompanying drawings. Wherever possible, the same reference numerals used throughout the drawings refer to the same or like parts.

Embodiments of the inventive subject matter solve at least some of the problems in the art by providing a system, method, and computer software code for determining and implementing an automated set-up of a vehicle system, such as a distributed power train or other vehicle consist. An apparatus, such as a data processing system, including a CPU, memory, I/O, program storage, a connecting bus, and other appropriate components, could be programmed or otherwise designed to facilitate the practice of the method of the inventive subject matter. Such a system would include appropriate program for executing the method of the inventive subject matter.

Also, an article of manufacture, such as a pre-recorded disk or other similar computer program product for use with a data processing system, could include a storage medium (e.g., a tangible and non-transitory computer readable storage medium) and program (e.g., one or more sets of instructions for directing a processor to perform one or more operations) recorded thereon for directing the data processing system to facilitate the practice of a method of the inventive subject matter. Such apparatus and articles of manufacture also fall within the spirit and scope of the embodiments of the inventive subject matter.

Broadly speaking, at least one technical effect of the inventive subject matter provides for a method, system, and computer software code for automated set-up of a vehicle system, such as a distributed power train or other vehicle consist. To facilitate an understanding of the embodiments of the inventive subject matter, it is described hereinafter with reference to specific implementations thereof. Embodiments of the invention may use program modules that may include routines, programs, objects, components, data structures, etc. that perform particular tasks or implement particular abstract data types. For example, the software programs that underlie embodiments of the inventive subject matter may be coded in different languages for use with different platforms.

Though one or more embodiments of the inventive subject matter are disclosed below as operating with hand-held devices, other embodiments may be practiced with other computer system configurations, including multiprocessor systems, microprocessor-based or programmable consumer electronics, minicomputers, mainframe computers, and the like. Embodiments of the inventive subject matter may also be practiced in distributed computing environments where tasks are performed by remote processing devices that are linked through a communications network. In a distributed computing environment, program modules may be located in both local and remote computer storage media including memory storage devices. These local and remote computing environments may be contained entirely within the locomotive, or adjacent locomotives in consist, or off-board in wayside or central offices where wireless communication is used.

Throughout this document the term vehicle consist is used. A vehicle consist is a group of two or more vehicles that are mechanically coupled to travel together along a route. A vehicle consist may have one or more propulsion-generating units (e.g., vehicles capable of generating propulsive force, which also are referred to as propulsion units) in succession and connected together so as to provide motoring and/or braking capability for the vehicle consist. The propulsion units may be connected together with no other vehicles or cars between the propulsion units. One example of a vehicle consist is a locomotive consist that includes locomotives as the propulsion units. Other vehicles may be used instead of or in addition to locomotives to form the vehicle consist. A vehicle consist can also include non-propulsion units, such as where two or more propulsion units are connected with each other by a non-propulsion unit, such as a rail car, passenger car, or other vehicle that cannot generate propulsive force to propel the vehicle consist. A larger vehicle consist, such as a train, can have sub-consists. Specifically, there can be a lead consist (of propulsion units), and one or more remote consists (of propulsion units), such as midway in a line of cars and another remote consist at the end of the train. The vehicle consist may have a lead propulsion unit and a trail or remote propulsion unit. The terms "lead," "trail," and "remote" are used to indicate which of the propulsion units control operations of other propulsion units, and which propulsion units are controlled by other propulsion units, regardless of locations within the vehicle consist. For example, a lead propulsion unit can control the operations of the trail or remote propulsion units, even though the lead propulsion unit may or may not be disposed at a front or leading end of the vehicle consist along a direction of travel. A vehicle consist can be configured for distributed power operation, wherein throttle and braking commands are relayed from the lead propulsion unit to the remote propulsion units by a radio link or physical cable. Toward this end, the term vehicle consist should be not be considered a limiting factor when discussing multiple propulsion units within the same vehicle consist.

Referring now to the drawings, embodiments of the inventive subject matter will be described. FIG. 1 depicts an embodiment of a system for remotely setting up, linking, and testing operations of a vehicle consist. In one embodiment, the system may set up, link, and/or test distributed power operations of a vehicle consist such as a train. At a location, or remote location, such as away from a vehicle consist 5, such as in a tower 7, a setup unit 10 is provided for an operator to use. The setup unit 10 can be a unit that sets up the vehicle consist 5 for distributed power operations or for other operations. In another embodiment, an operator aboard a vehicle consist, such as located in a lead propulsion unit 21 of the vehicle consist 5, may use the setup unit 10 to remotely setup remote propulsion units 22 in the vehicle consist 5 for operations, such as distributed power operations. While the propulsion units 21, 22 may be referred to as lead and remote locomotives, respectively, alternatively the units 21, 22 may represent other vehicles capable of generating propulsive force to propel the vehicle consist 5.

Figure 2:
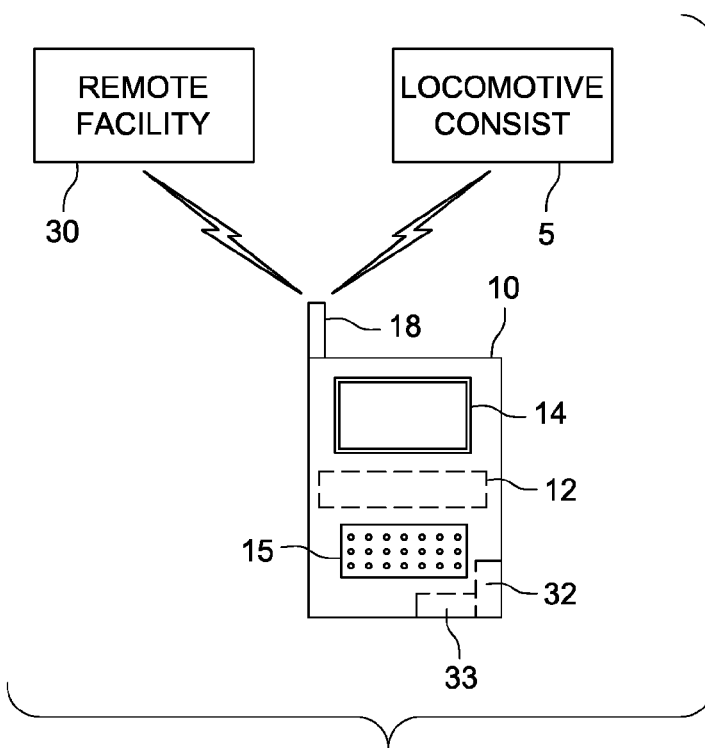
FIG. 2 depicts an embodiment of a setup unit.

FIG. 2 depicts an embodiment of a setup unit. The setup unit 10 has a computer, or processor, 12 with a display 14 and operator input device 15, such as but not limited to a mouse and/or a keyboard. As disclosed herein, the setup unit 10 may be a hand-held device. A first communication interface 18 is also connected to the setup unit 10. As further illustrated in FIG. 1, the first communication interface 18 is able to communicate with a distributed power system 20 on the propulsion units 21, 22.

At the vehicle consist 5, a second communication interface 24 is provided to receive and send communications between itself and the first communication interface 18 at the setup unit 10. The first communication interface 18 at the setup unit 10 is in communication with the distributed power system 20 so that the setup unit 10 can receive information from the distributed power system 20 and send commands to the distributed power system 20. Examples of the distributed power system include, but are not limited to Assignee's LOCOTROL® Locomotive System Integration (LSI) Electronics, or System, and/or other systems/equipment that functions with the LSI system.

In an example use of the inventive subject matter, an operator may use the setup unit 10 to input such information as, but not limited to, road numbers of the lead propulsion unit 21 and all remote propulsion units 22 within the vehicle consist 5 to be linked (or other identifying information), the orientation of each propulsion unit 21, 22 within the vehicle consist 5 (e.g., whether the short hood or long hood of the respective propulsion unit 21, 22 is forward), and the like. By doing so, the propulsion units will know which direction is forward since each of the propulsion units 21, 22 may have either its respective short hood or long hood facing the direction that the vehicle consist 5 will move.

The setup unit 10 may transmit this information to each distributed power generating unit 21, 22 in the vehicle consist 5, or to the lead propulsion unit 21, which in turn can communicate with the remote propulsion units 22. In one embodiment, the on-board distributed system 20 only accepts such data when the propulsion units 21, 22 are not already linked. In another embodiment, the operator may override a prior link of the propulsion units 21, 22 with new information.

The on-board distributed system 20 may accept the data and proceed with linking the propulsion units 21, 22. The linking process could continue through completion of a test that confirms proper linking of the locomotives. The complete linking process could be completed without human intervention aboard any of the propulsion units 21, 22 and prior to operators physically entering the vehicle consist 5.

For example, with the LOCOTROL® LSI system, in an embodiment, information that may be provided on a display of the LSI system is also provided on a display on the setup unit 10. Based on how the LSI system functions, the remote propulsion units 21, 22 in a vehicle consist 5 are set up first. The lead propulsion unit 21 of the vehicle consist 5 is only set after all setups for the remote propulsion units 22 are completed. The distributed power operations can also be shutdown using an embodiment of the inventive subject matter. As discussed in more detail below with respect to FIG. 3, the lead propulsion unit 21 may report a status back to the setup unit 10, either confirming the linking process was successful or reporting a failure and identifying what step in the process detected the failure along with any information, or data, as to what could have caused the failure.

As further illustrated in FIG. 2, the setup unit may be accessible by other remote locations 30, such as a dispatch location and/or a repair depot. This remote location will know when the vehicle consist 5 is properly linked. If the linking process is not completed due to a failure, this information can also be forwarded.

In an embodiment, connections between the setup unit 10 and the distributed power system 20 may be via radio and/or any other form of wireless communication. In another embodiment, communication may take place via a wired connection. Communications between the setup unit 10 and the remote facility 7 may be via wireless communications and/or wired communications. For example, communications may occur using the Internet where dial-in-connections, cable modems, special high-speed IDSN lines, networks such as local area networks, wide area networks, etc. may be utilized. Furthermore when the setup unit 10 is used aboard the vehicle consist 5, such aboard the lead propulsion unit 21, the unit 10 may be directly interfaced into the distributed power system 20 aboard the lead propulsion unit 21.

In addition to the parts of the setup unit 10 disclosed above, the setup unit 10 may also have a mass storage device 32 and memory 33. The setup unit 10 may store information regarding linking processes that are completed so that data about prior linking processes may be later communicated to a remote facility.

Figure 3:
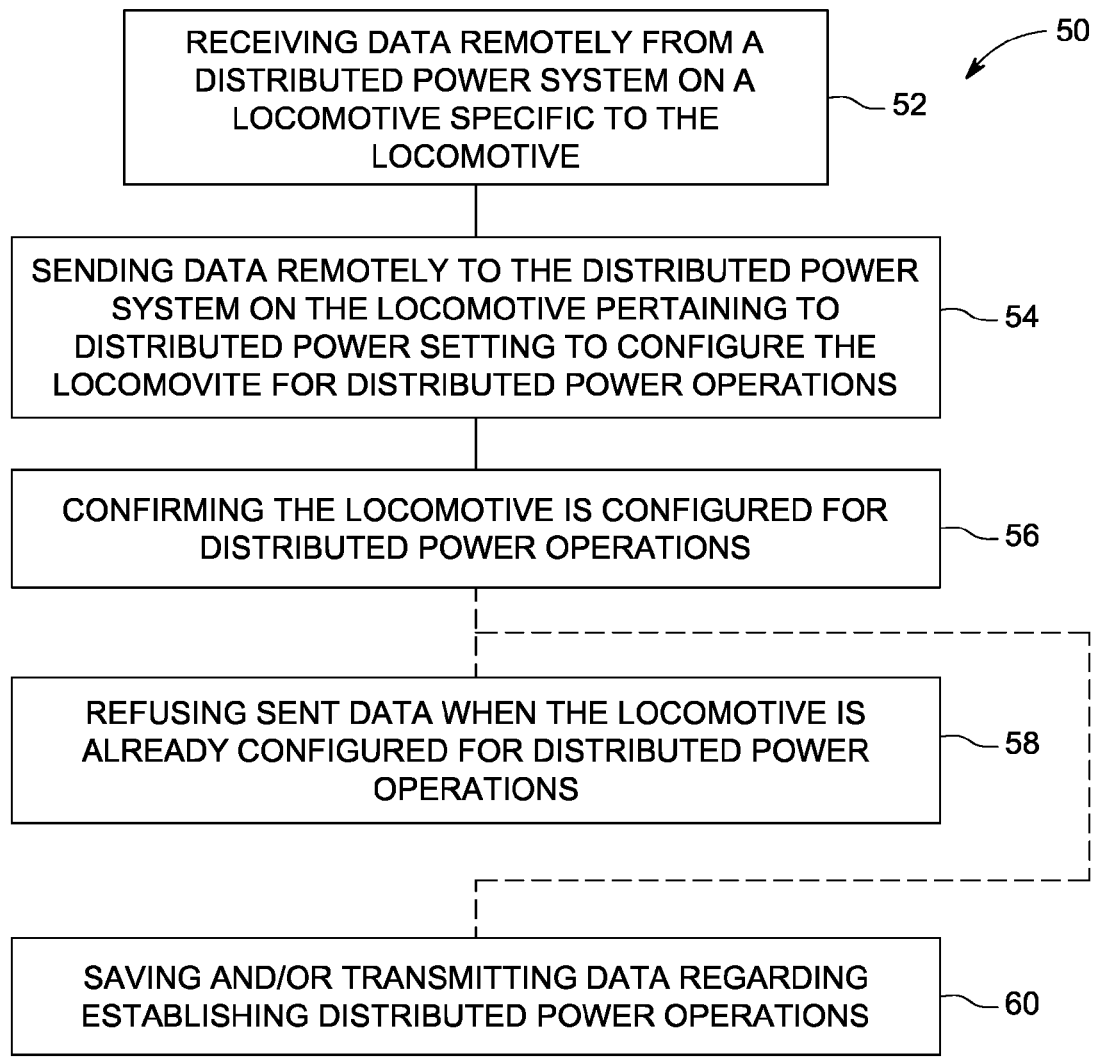
FIG. 3 depicts an embodiment of a flowchart of a method for remotely setting up, linking and testing distributed power operations of a vehicle consist.

FIG. 3 depicts a flowchart of a method for remotely setting up, linking, and testing operations of a vehicle consist. As discussed above and illustrated in the flowchart 50, the method includes receiving data remotely from a distributed power system on a propulsion unit, at 52. This data may be specific to the propulsion unit that receives the data. The data is sent remotely to the distributed power system on the propulsion unit pertaining to distributed power settings in order to configure the propulsion unit for distributed power operations, at 54. A confirmation is made as to whether the propulsion unit is configured for distributed power operations, at 56. As discussed above, if the propulsion unit 21, 22 is already configured for distributed power operations, the method may refuse the sent data, at 58. Additionally, data may be saved and/or transmitted regarding the establishment, or inability to establish, distributed power operations, at 60. As discussed above, the data may be sent back to the setup unit 10. If a failure occurs the data may include, but is not limited to, what step in the process detected the failure including data as to what could have caused the failure.

Figure 4:
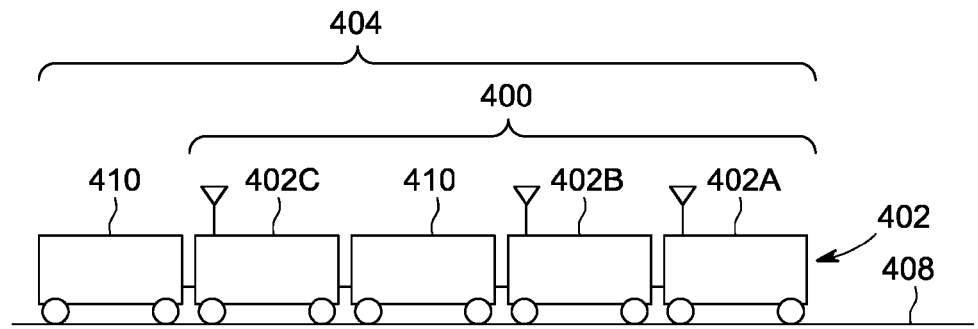
FIG. 4 is a schematic illustration of another embodiment of a communication system for controllably linking propulsion units in a vehicle consist.

FIG. 4 is a schematic illustration of another embodiment of a system 400 (e.g., a communication system) for controllably linking propulsion units 402 in a vehicle consist 404. The vehicle consist 404 includes one or more propulsion units 402 (e.g., vehicles that generate propulsive force to propel the vehicle consist 404). In the illustrated embodiment, the vehicle consist 404 includes three propulsion units 402A, 402B, 402C, but alternatively may include two propulsion units 402 or more than three propulsion units 402. The vehicle consist 404 is shown as a train, but alternatively may represent another system of vehicles that are connected with each other to travel together along a route 408, such as a track, road, waterway, and the like. The propulsion units 402 may represent rail vehicles that are powered to propel the vehicle consist 404, such as propulsion units. Alternatively, the propulsion units 402 may represent other vehicles that generate propulsive force, such as other rail vehicles, other off-highway vehicles, automobiles, marine vessels, and the like. The vehicle consist 404 includes several non-propulsion units 410, such as vehicles that do not generate propulsive force to propel the vehicle consist 404. Examples of such non-propulsion units 410 include, but are not limited to, rail cars, passenger cars, and the like.

The communication system 400 allows for the propulsion units 402 of the vehicle consist 404 to be controllably linked with each other. When the propulsion units 402 are controllably linked, at least one of the propulsion units 402 (referred to herein as a lead propulsion unit) can remotely control operations of other propulsion units 402 (referred to herein as trail or remote propulsion units). When the propulsion units 402 are not controllably linked, the lead propulsion unit 402 may not be able to control operations of the remote propulsion units. The communication system 400 is shown as including antennas of the propulsion units 402 that wirelessly communicate with each other, but alternatively or additionally may include one or more wired connections, such as by using communications through one or more cables, buses, trainlines, conductors used for communications with electronically controlled pneumatic (ECP) brakes, conductors used for communications within an electric multiple unit (MU cable), and the like.

The terms "lead" and "remote" are meant to indicate which propulsion units 402 control operations of other propulsion units 402, and does not necessarily indicate relative locations of the propulsion units 402 in the vehicle consist 404. By "remotely" control, it is meant that the operations of the remote propulsion unit 402 are controlled from a location that is outside of the remote propulsion unit 402, although not necessarily far away from the remote propulsion unit 402. In one embodiment, the communication system 400 controllably links the propulsion units 402 in a distributed power system so that the lead propulsion unit 402 remotely controls the tractive efforts (e.g., propulsive forces) generated by the remote propulsion units 402.

The remote propulsion units 402 can prevent a lead propulsion unit 402 from remotely controlling operations of the remote propulsion units 402 unless the lead propulsion unit 402 and the remote propulsion unit 402 are controllably linked with each other. Several remote propulsion units 402 (e.g., propulsion units 402B, 402C) may be controllably linked with a single lead propulsion unit 402 (e.g., propulsion unit 402A). Alternatively, one or more remote propulsion units 402 can be controllably linked with more than one lead propulsion unit 402.

In order to controllably link propulsion units 402 with each other, such as in a distributed power system, a linking process may be performed. The linking process described herein is used to associate (e.g., controllably link) a single lead propulsion unit 402 with a single remote propulsion unit 402. The process may be used, however, to controllably link the lead propulsion unit 402 with several remote propulsion units 402.

Figure 5A:
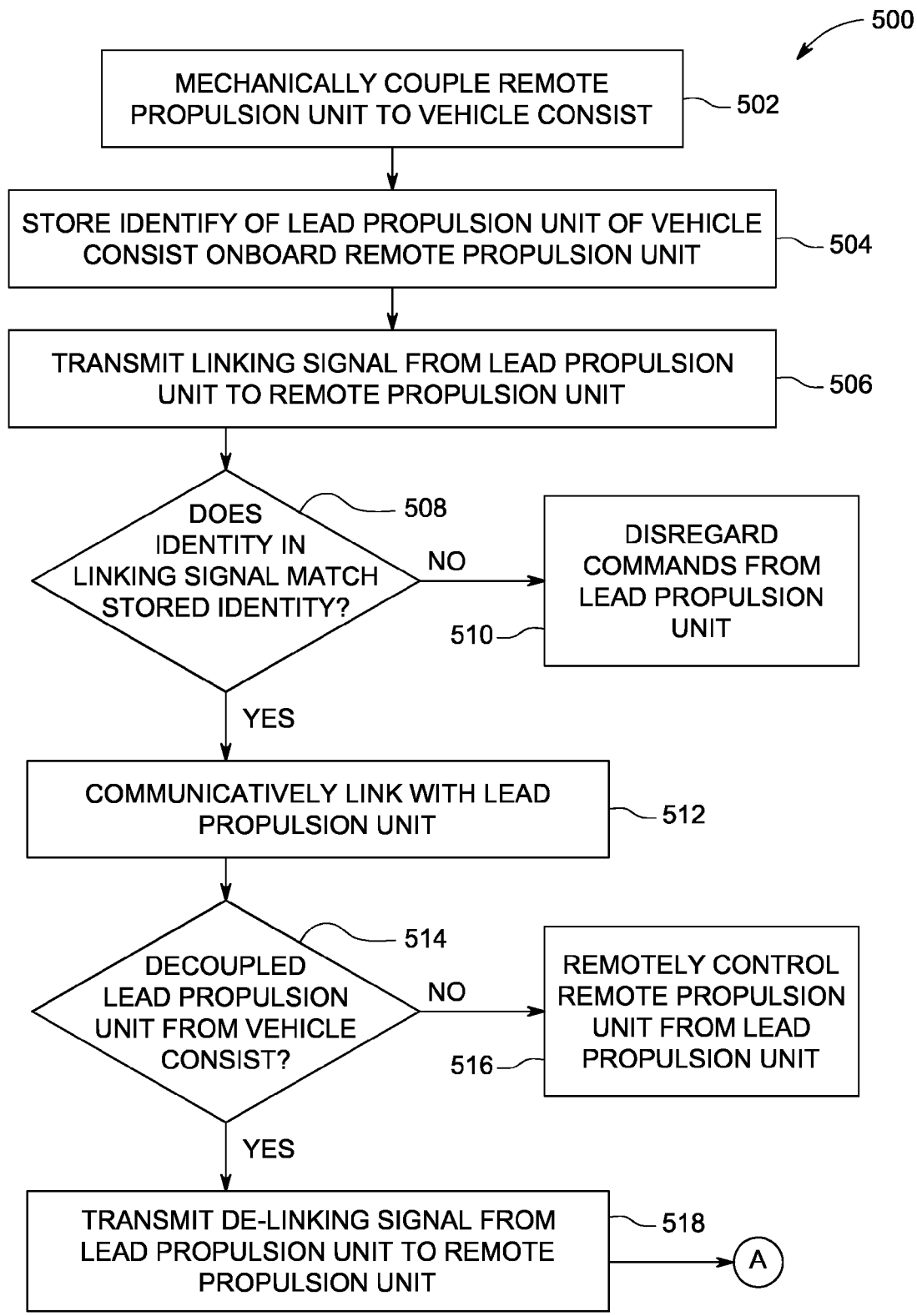
FIGS. 5A and 5B illustrate a flowchart of one embodiment of a method or process for controllably linking propulsion units of a vehicle consist.
Figure 5B:
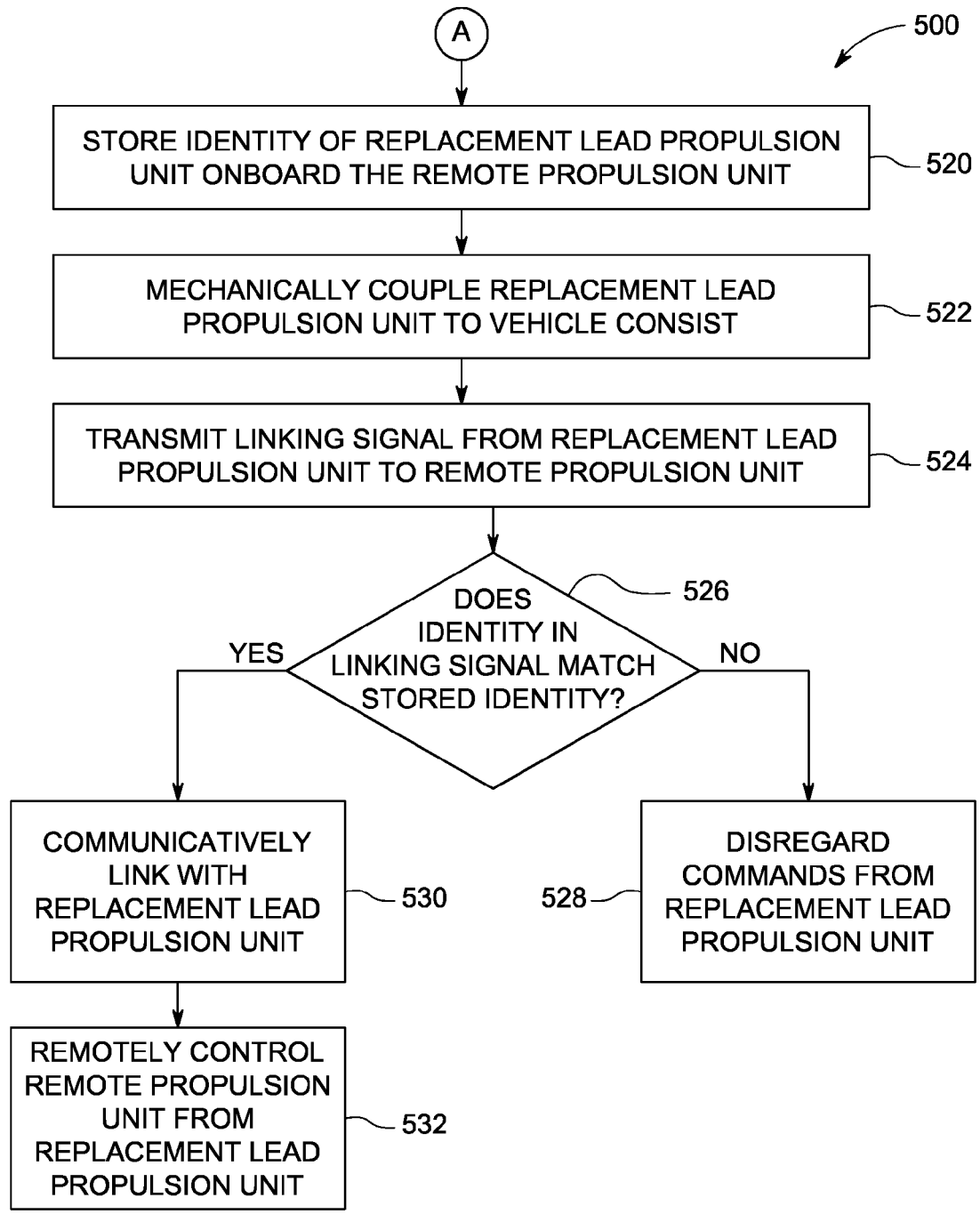

FIGS. 5A and 5B illustrate a flowchart of one embodiment of a method or process 500 for controllably linking propulsion units of a vehicle consist. The method 500 can represent the linking process that is used to controllably link or couple a remote propulsion unit 402 (shown in FIG. 4) with a first lead propulsion unit 402, to communicatively de-couple the remote propulsion unit 402 from the first lead propulsion unit 402, and then to controllably link the remote propulsion unit 402 with another, replacement lead propulsion unit 402. The linking of the remote propulsion unit 402 with the replacement lead propulsion unit 402 can be performed without requiring a human operator to enter into the remote propulsion unit 402 after the remote propulsion unit 402 is first controllably linked with the first lead propulsion unit 402.

At 502, a remote propulsion unit 402B (shown in FIG. 4) is mechanically coupled with the vehicle consist 404 (shown in FIG. 4). The remote propulsion unit 402B can be sequentially coupled with other propulsion units 402 and/or non-propulsion units 410 (shown in FIG. 4).

At 504, an identity of the first lead propulsion unit 402A is provided to the remote propulsion unit 402B. For example, an operator may enter into the remote propulsion unit 402B and manually input the identity of the first lead propulsion unit 402A into a setup unit of the remote propulsion unit 402B. The propulsion units 402 may be associated with unique identities that allow the remote propulsion unit 402B to differentiate between the different propulsion units 402. These identities may be alphanumeric strings, numeric strings, letter strings, or the like. The identity of the lead propulsion unit 402A that is provided to the remote propulsion unit 402B is referred to herein as a designated identity, as the identity may be designated by a person, component, device, or system other than the lead propulsion unit 402A.

At 506, a linking signal is transmitted from the lead propulsion unit 402A to the remote propulsion units 402. For example, a communication interface of the lead propulsion unit 402A may transmit or broadcast signals to the remote propulsion units 402 of the vehicle consist 404. The linking signal includes an identity of the lead propulsion unit 402A that transmitted the linking signal. A communication interface onboard the remote propulsion unit 402B may receive the linking signal and extract the identity of the lead propulsion unit 402A from the linking signal.

At 508, a determination is made as to whether the identity that is included in the received linking signal corresponds to the designated identity that is locally stored at the remote propulsion unit 402B. For example, a setup unit onboard the remote propulsion unit 402B can compare the identity in the received linking signal with the locally stored designated identity to see if the identities both represent the same lead propulsion unit 402A. If the identity input at the remote propulsion unit 402B and the identity communicated in the received linking signal do not both represent the same lead propulsion unit 402A, then the remote propulsion unit 402B determines that the linking signal was sent from a propulsion unit 402 that is not the same propulsion unit 402 identified by the identity provided to the remote propulsion unit 402B. As a result, flow of the method 500 proceeds to 510. If both identities represent the same lead propulsion unit 402A, then the remote propulsion unit 402B determines that the linking signal was sent from the lead propulsion unit 402A previously identified by the operator. As a result, flow of the method 500 proceeds to 512.

At 510, the remote propulsion unit 402B does not controllably link with the lead propulsion unit 402A that transmitted the linking signal and command or control signals that are sent by the lead propulsion unit 402A to the remote propulsion unit 402B are ignored by the remote propulsion unit 402B.

At 512, the remote propulsion unit 402B is controllably linked with the lead propulsion unit 402A. For example, once a setup unit onboard the remote propulsion unit 402B confirms that the lead propulsion unit 402A is identified by both the designated identity stored onboard the remote propulsion unit 402B and the identity sent in the linking signal, then the setup unit may controllably link with the lead propulsion unit 402A. The lead propulsion unit 402A may then remotely control operations of the remote propulsion unit 402B.

At 514, a determination is made as to whether the lead propulsion unit 402A is to be removed from the vehicle consist 404 or remain in the vehicle consist 404. For example, one or more faults may occur during operation of the lead propulsion unit 402A, such as faults in the communication interface of the lead propulsion unit 402A. As a result, the lead propulsion unit 402A may be unable to remotely control the remote propulsion units 402. If the lead propulsion unit 402A does not need to be decoupled from the vehicle consist 404 and replaced with another lead propulsion unit 402, flow of the method 500 may proceed to 516. If the lead propulsion unit 402A does need to be decoupled from the vehicle consist 404 and replaced, then flow of the method 500 can continue to 518.

At 516, the lead propulsion unit 402A remotely controls operations of the remote propulsion unit 402B during movement of the vehicle consist 404 along the route 408 (shown in FIG. 4). For example, the lead propulsion unit 402A can direct the tractive efforts, braking efforts, and the like, that are provided by the remote propulsion unit 402B during travel of the vehicle consist 404.

At 518, the lead propulsion unit 402A is to be removed from the vehicle consist 404 and, as a result, transmits a de-linking signal to the remote propulsion unit 402B. The de-linking signal may be transmitted before or after the lead propulsion unit 402A is removed from the vehicle consist 404. The de-linking signal notifies the remote propulsion unit 402B that the lead propulsion unit 402A is being removed and replaced by another, replacement propulsion unit 402.

Figure 6:
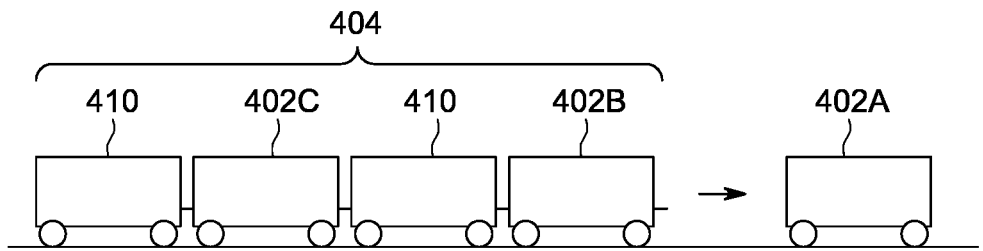
FIG. 6 schematically illustrates removal of a lead propulsion unit from the vehicle system shown in FIG. 4 in accordance with one embodiment.
Figure 7:
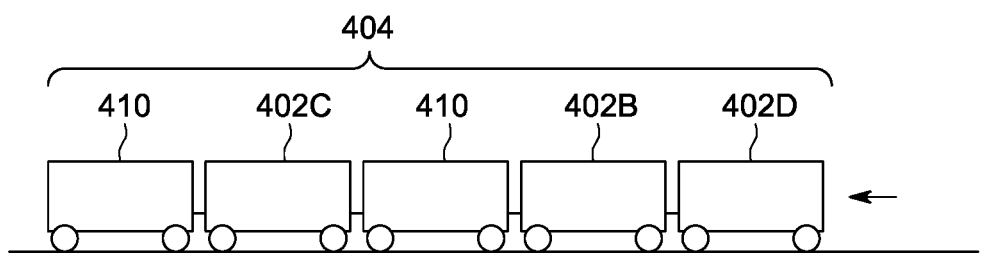
FIG. 7 schematically illustrates coupling of a replacement lead propulsion unit with the vehicle consist shown in FIG. 4 in accordance with one embodiment.

FIG. 6 schematically illustrates removal of the lead propulsion unit 402A from the vehicle consist 404 in accordance with one embodiment. The lead propulsion unit 402A can be mechanically de-coupled from the vehicle consist 404 and moved away from the vehicle consist 404. FIG. 7 schematically illustrates coupling of a replacement lead propulsion unit 402D with the vehicle consist 404 in accordance with one embodiment. The replacement lead propulsion unit 402D can be mechanically coupled with the vehicle consist 404 after the lead propulsion unit 402A is removed from the vehicle consist 404.

Returning to the discussion of the method 500 shown in FIGS. 5A and 5B, the de-linking signal also can include an identity of the replacement lead propulsion unit 402D (referred to herein as a replacement identity). An operator may input the replacement identity into a setup unit onboard the lead propulsion unit 402A. Alternatively, the replacement identity may be communicated to the lead propulsion unit 402A from a remote location.

At 520 (shown in FIG. 5B), the identity of the replacement lead propulsion unit 402D is stored onboard the remote propulsion unit 402B. For example, the setup unit disposed onboard the remote propulsion unit 402B can locally store the replacement identity in an onboard memory.

At 522, the replacement lead propulsion unit 402D is mechanically coupled with the vehicle consist 404, as shown in FIG. 7. At 524, a linking signal (also referred to herein as a replacement linking signal) is transmitted from the replacement lead propulsion unit 402D to the remote propulsion unit 402B. Similar to the linking signal transmitted by the previous lead propulsion unit 402A, the replacement linking signal may include the identity of the replacement propulsion unit 402D.

At 526, a determination is made as to whether the identity that is included in the replacement linking signal corresponds to the replacement identity that is locally stored at the remote propulsion unit 402B. For example, the setup unit onboard the remote propulsion unit 402B can compare the identity in the received replacement linking signal with the locally stored replacement identity to see if the identities both represent the same replacement lead propulsion unit 402D. If the identities do not both represent the same replacement lead propulsion unit 402D, then the remote propulsion unit 402B determines that the replacement linking signal was sent from a propulsion unit 402 that is not the same propulsion unit 402 identified by the replacement identity provided to the remote propulsion unit 402B in the de-linking signal sent by the previous lead propulsion unit 402A. As a result, flow of the method 500 proceeds to 528.

If both identities represent the same replacement lead propulsion unit 402D, then the remote propulsion unit 402B determines that the replacement linking signal was sent from the same replacement lead propulsion unit 402D previously identified by the de-linking signal from the previous lead propulsion unit 402A. As a result, flow of the method 500 proceeds to 530.

At 528, the remote propulsion unit 402B does not controllably link with the replacement lead propulsion unit 402D that transmitted the replacement linking signal. Consequently, command or control signals that are sent by the replacement lead propulsion unit 402D to the remote propulsion unit 402B are ignored by the remote propulsion unit 402B.

At 530, the remote propulsion unit 402B is controllably linked with the replacement lead propulsion unit 402D. For example, once a setup unit onboard the remote propulsion unit 402B confirms that the replacement lead propulsion unit 402D is identified by both the replacement identity stored onboard the remote propulsion unit 402B and the identity sent in the replacement linking signal, then the setup unit may controllably link with the replacement lead propulsion unit 402D.

At 532, the replacement lead propulsion unit 402D remotely controls operations of the remote propulsion unit 402B. For example, the replacement lead propulsion unit 402D can direct the tractive efforts, braking efforts, and the like, that are provided by the remote propulsion unit 402B during travel of the vehicle consist 404.

Figure 8:
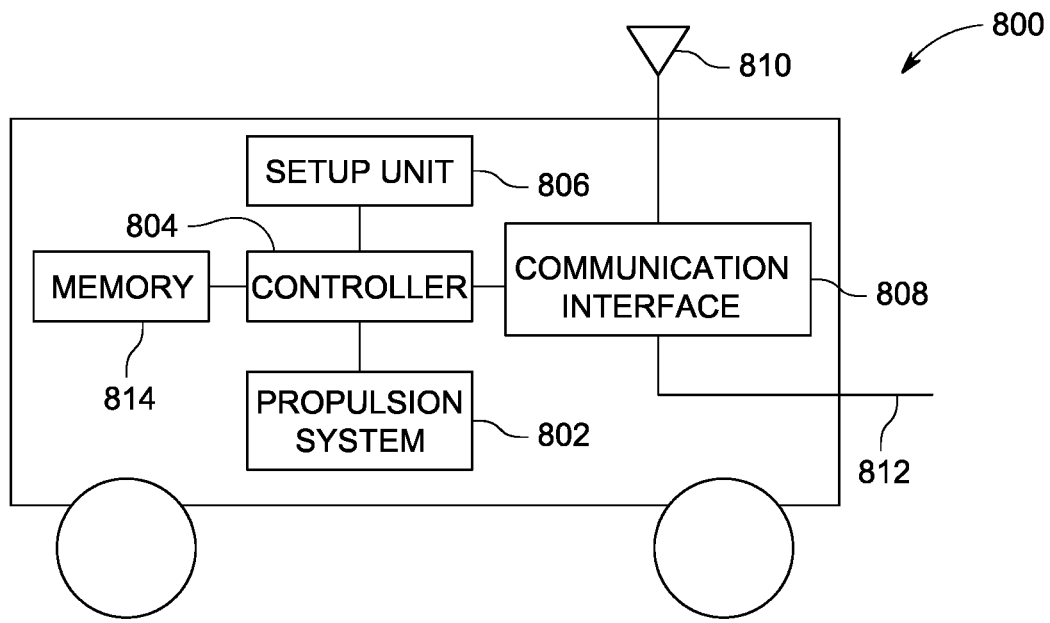
FIG. 8 is a schematic illustration of one embodiment of a propulsion unit.

FIG. 8 is a schematic illustration of one embodiment of a propulsion unit 800. The propulsion unit 800 may represent one or more of the propulsion units 402 shown in FIGS. 4, 6, and 7. For example, the propulsion unit 800 may represent the lead propulsion unit 402A, the remote propulsion unit 402B, and/or the replacement lead propulsion unit 402D.

The propulsion unit 800 includes a propulsion system 802 that generates propulsive force to propel the propulsion unit 800. The propulsion system 802 may include or represent one or more engines, alternators, generators, energy storage devices (e.g., batteries, flywheels, and the like), catenaries, shoes, traction motors, and the like.

The propulsion system 802 is controlled by a controller 804. The controller 804 includes or represents one or more processors, input devices, output devices, and the like, that is used to control operations of the propulsion system 802. The controller 804 may receive input from an operator disposed onboard the propulsion unit 800 to control the propulsion system 802. Alternatively or additionally, the controller 804 may be remotely controlled by another propulsion unit 800. For example, if the controller 804 is disposed onboard a remote propulsion unit that is controllably linked with a lead propulsion unit in a distributed power system, the controller 804 may receive control signals or commands from the lead propulsion unit. The controller 804 may then implement the commands from the lead propulsion unit to control operations of the propulsion system 802.

A setup unit 806 disposed onboard the propulsion unit 800 may be similar to the setup unit 10 shown in FIG. 2. As described above, the setup unit 806 can include or represent a processor, output device (e.g., a display), and an input device. The setup unit 806 can be a portable, hand-held device that is capable of being moved by an average human being within the propulsion unit 800 and/or outside of the propulsion unit 800 without mechanical assistance to lift and carry the setup unit 806. Alternatively, the setup unit 806 may be fixed within the propulsion unit 800, such as by being mounted to a surface within the propulsion unit 800.

The setup unit 806 is operably connected with a communication interface 808, which may be similar to the communication interface 18 shown in FIG. 2. The communication interface 808 can include circuitry and associated hardware and/or software for allowing the propulsion unit 800 to communicate with one or more other propulsion units 800 or other locations. The communication interface 808 includes an antenna 810 that wirelessly communicates with other propulsion units 800. Additionally or alternatively, the communication interface 808 can be connected with a conductive pathway 812 that is joined with the communication interface 808 of another propulsion unit 800. The communication interfaces 808 can communicate with each other over this conductive pathway 812. The conductive pathway 812 can represent one or more cables, buses, and the like, such as an ECP line, a trainline, an eMU line, or the like.

A memory 814 is disposed onboard the propulsion unit 800 and is accessible to the controller 804, setup unit 806, and/or communication interface 808. The memory 814 can represent a tangible and non-transitory computer readable storage medium, such as a computer hard drive or other volatile or non-volatile memory. The memory 814 can store one or more sets of instructions (e.g., software) that directs the setup unit 806 and/or controller 804 to perform one or more operations. As described herein, the memory 814 can be used to store identities of propulsion units 800. For example, where the propulsion unit 800 represents a remote propulsion unit 800 (e.g., the remote propulsion unit 402B in FIG. 4), the setup unit 806 can be used to receive an operator-designated identity of a first lead propulsion unit and to store the designated identity in the memory 814. The setup unit 806 can then compare the designated identity in the memory 814 with an identity that is received by the communication interface 806 via a linking signal, as described above. When a replacement identity is received by the communication interface 806, the setup unit 806 can store the replacement identity in the memory 814, also as described above.

In one embodiment, the propulsion units described herein may be interchangeable in that one or more propulsion units may be capable of operating as lead propulsion units and remote propulsion units. For example, a first propulsion unit may operate as a lead propulsion unit in a vehicle consist to control operations of other propulsion units in the vehicle consist during a first time period. During a different, second time period (e.g., during the same or different trip of the vehicle consist), the first propulsion unit may operate as a remote propulsion unit so that operations of the first propulsion unit are controlled by another propulsion unit in the vehicle consist.

Figure 9:
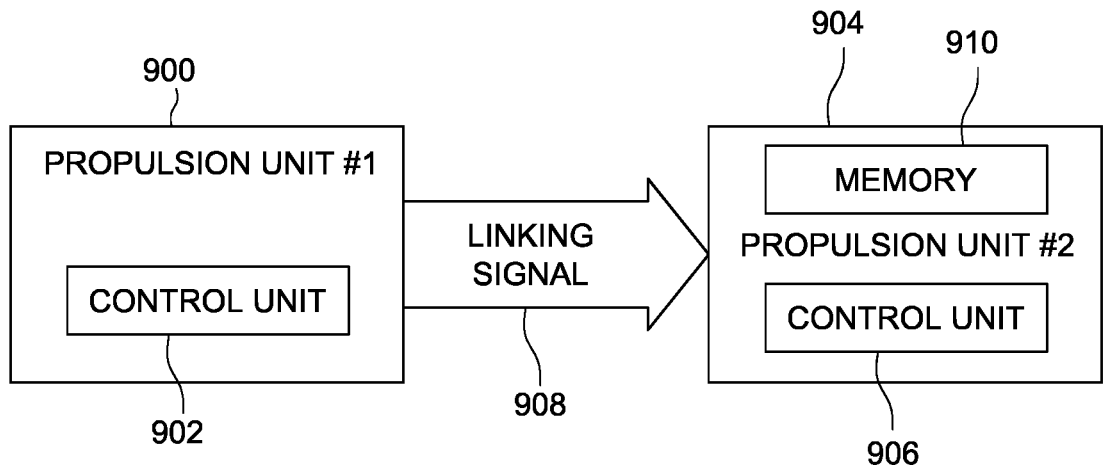
FIG. 9 illustrates one embodiment of a control unit of a propulsion unit operating in a first mode of operation.
Figure 10:
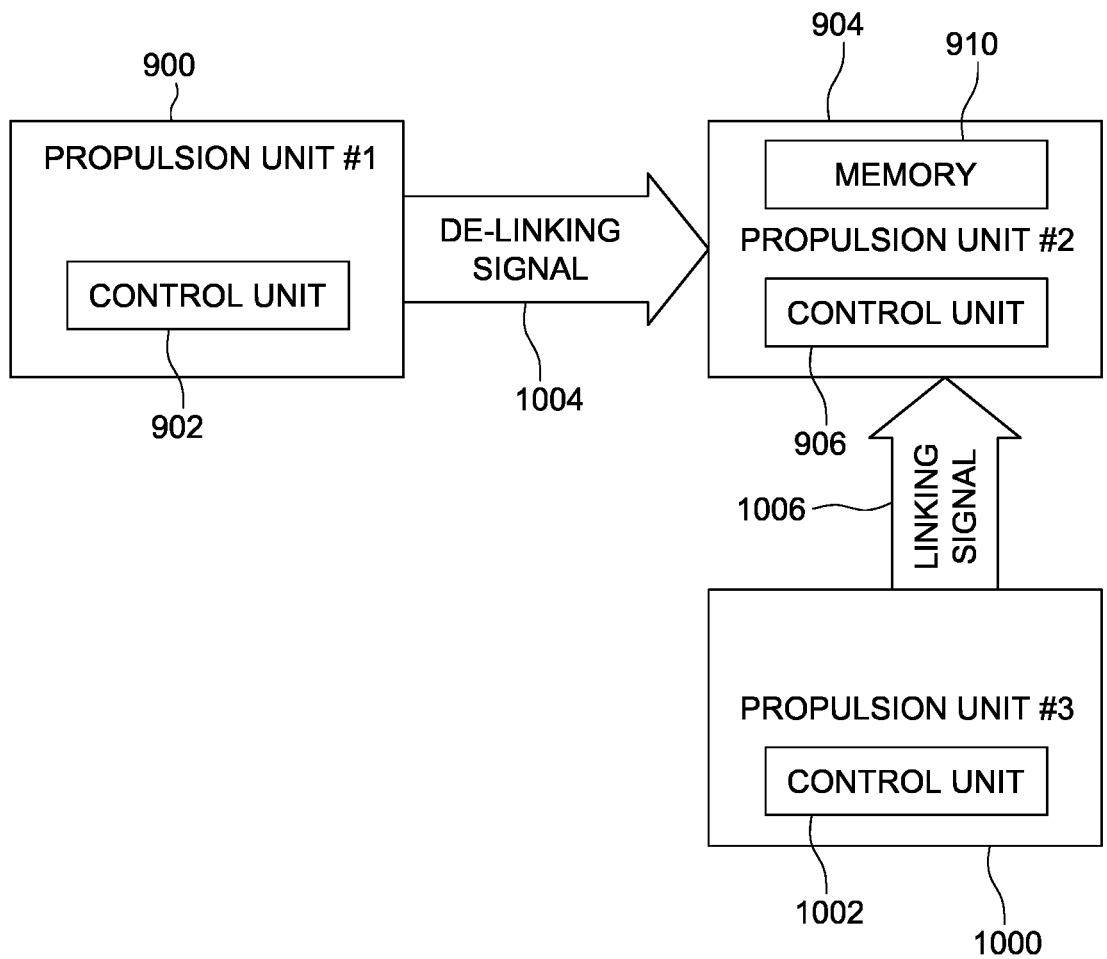
FIG. 10 illustrates one embodiment of the control unit of the propulsion unit shown in FIG. 9 operating in a different, second mode of operation.
Figure 11:
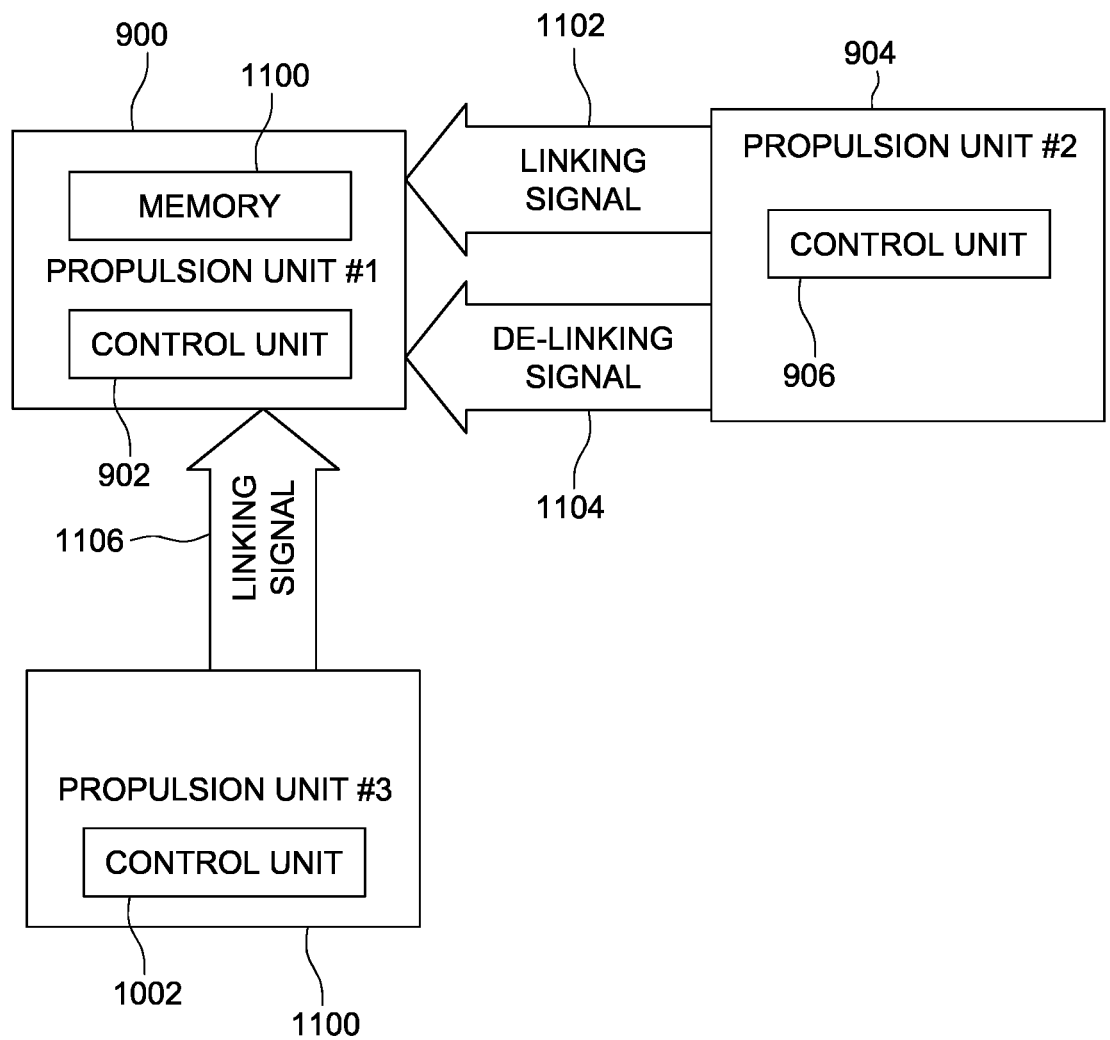
FIG. 11 illustrates one embodiment of the control unit of the first propulsion unit shown in FIG. 9 operating in a different, third mode of operation.

FIGS. 9 through 11 illustrate schematic diagrams of one embodiment of a first propulsion unit 900 (e.g., "Propulsion Unit #1") operating in different modes. The first propulsion unit 900 may represent one or more of the propulsion units described herein. The first propulsion unit 900 includes a control unit 902, which may represent the setup unit 806, controller 804, and/or communication interface 806 (shown in FIG. 8). The first propulsion unit 900 also can include a memory 1100 (shown in FIG. 11) similar to the memory 814 (shown in FIG. 8). Also shown in FIGS. 9 through 11 are second and third propulsion units 904, 1000 (e.g., "Propulsion Unit #2" and "Propulsion Unit #3," respectively), which may represent one or more of the propulsion units described herein. The second and third propulsion units 904, 1000 also can include control units 906, 1002 and/or memories 910, similar to the first propulsion unit 900. In one embodiment, the control units 902, 906, 1002 of the first, second, and third propulsion unit 900, 904, 1000 may interchangeably switch between operating modes to switch which of the propulsion units 900, 904, 1000 operate as a lead propulsion unit (e.g., that remotely controls operations of other propulsion units in a vehicle consist) and which of the propulsion units 900, 904, 1000 operate as a remote propulsion unit. While the discussion herein focuses on the control unit 902 of the first propulsion unit 900 switching between different operations modes, the discussion also may apply to the control units 906 and/or 1002 of the second and/or third propulsion units 904, 1000.

FIG. 9 illustrates the control unit 902 of the first propulsion unit 900 operating in a first mode of operation where the first propulsion unit 900 is to controllably link with the second propulsion unit 904 to control operations of the second propulsion unit 904. As described above, the control unit 902 transmits a first linking signal 908 to the control unit 906 of the second propulsion unit 904. The first linking signal 908 includes or represents an identity of the control unit 902 of the first propulsion unit 900 (and/or an identity of the first propulsion unit 900). The control unit 906 compares this identity to a designated identity stored in the memory 910 (or received from an operator, received from an off-board location, or the like), as described above. If the received identity of the first linking signal 908 matches the designated identity, then the control unit 902 of the first propulsion unit 900 is controllably linked with the control unit 906 of the second propulsion unit 904 in order to remotely control operations of the second propulsion unit 904.

FIG. 10 illustrates the control unit 902 of the first propulsion unit 900 operating in a different, second mode of operation where the first propulsion unit 900 de-links from the second propulsion unit 904. The control unit 902 transmits a first de-linking signal 1004 to the control unit 906 of the second propulsion unit 904 when the first propulsion unit 900 is to be mechanically decoupled from the vehicle consist that includes the first and second propulsion units 900, 904. The first de-linking signal 1004 includes a first replacement identity of the third propulsion unit 1000 that is to be mechanically coupled to the vehicle consist to replace the first propulsion unit 904. The control unit 1002 of the third propulsion unit 1000 can transmit a second linking signal 1006 to the control unit 906 of the second propulsion unit 1000 that includes or represents an identity of the control unit 1002 (and/or an identity of the third propulsion unit 1000). As described above, the third propulsion unit 1000 can be joined with the vehicle consist to control the second propulsion unit 904 if the first replacement identity that is received in the de-linking signal 1004 matches or otherwise corresponds to the identity that is communicated in the linking signal 1006.

FIG. 11 illustrates the control unit 902 of the first propulsion unit 900 operating in a different, third mode of operation where the first propulsion unit 900 can operate as a remote propulsion unit. Similar to as described above, the control unit 902 of the first propulsion unit 900 can receive a third linking signal 1102 from the control unit 906 of the second propulsion unit 904. The control unit 902 can compare an identity that is communicated in the third linking signal 1102 with a designated identity that is stored in the memory 1100 of the first propulsion unit 900 (or received from an operator, received from an off-board source, or the like). If the identities match, then the control unit 902 may be controllably linked with the control unit 906 of the second propulsion unit 904 such that the control unit 906 of the second propulsion unit 904 remotely controls operations of the first propulsion unit 900.

In the third mode, the control unit 902 of the first propulsion unit 900 can receive a second de-linking signal 1104 from the control unit 906 of the second propulsion unit 904. As described above, the de-linking signal 1104 may be transmitted when the second propulsion unit 904 is to separate from the vehicle consist that includes the first propulsion unit 900. The second de-linking signal 1104 can include a replacement identity of a control unit on another propulsion unit.

The control unit 1002 of the third propulsion unit 1100 transmits a fourth linking signal 1106 to the control unit 902 of the first propulsion unit 900 when the third propulsion unit 1100 is to connect with the vehicle consist as a lead propulsion unit. The fourth linking signal 1106 includes an identity of the control unit 1002 of the third propulsion unit 1100 and/or an identity of the third propulsion unit 1100. The control unit 902 of the first propulsion unit 900 compares the identity that is received via the fourth linking signal 1106 with the replacement identity that is received via the de-linking signal 1104. If the identities match or otherwise correspond with each other (e.g., by identifying the same control unit and/or propulsion unit), then the control unit 902 of the first propulsion unit 900 can be controllably linked with the control unit 1002 of the third propulsion unit 1100 such that the control unit 1002 can remotely control operations of the first propulsion unit 900.

In one embodiment, a method (e.g., for controllably linking propulsion units, or propulsion units, in a vehicle consist) includes transmitting a linking signal from a first lead propulsion unit of a vehicle consist to a remote propulsion unit of the vehicle consist. The linking signal includes a first identity of the first lead propulsion unit. The remote propulsion unit and the first lead propulsion unit are controllably linked with each other when the first identity of the first lead propulsion unit in the linking signal corresponds to a designated identity that is stored onboard the remote propulsion unit. The remote propulsion unit allows the first lead propulsion unit to remotely control operations of the remote propulsion unit when the first lead propulsion unit and the remote propulsion unit are controllably linked. The method also includes transmitting a de-linking signal from the first lead propulsion unit to the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The method further includes transmitting a replacement linking signal from a second lead propulsion unit to the remote propulsion unit. The replacement linking signal includes a second identity of the second lead propulsion unit. The remote propulsion unit and the second lead propulsion unit are controllably linked when the second identity of the second lead propulsion unit corresponds to the replacement identity received at the remote propulsion unit. The remote propulsion unit allows the second lead propulsion unit to remotely control the operations of the remote propulsion unit when the second lead propulsion unit and the remote propulsion unit are controllably linked.

In one aspect, the remote propulsion unit prevents the first lead propulsion unit from remotely controlling operations of the remote propulsion unit when the remote propulsion unit is not controllably linked with the first lead propulsion unit.

In one aspect, the remote propulsion unit prevents the second lead propulsion unit from remotely controlling operations of the remote propulsion unit when the remote propulsion unit is not controllably linked with the second lead propulsion unit.

In another aspect, transmitting the linking signal occurs when both the first lead propulsion unit and the remote propulsion unit are mechanically coupled with the vehicle consist.

In another aspect, the method also includes inputting the designated identity into a memory disposed onboard the remote propulsion unit.

In another aspect, the method further includes confirming that the second lead propulsion unit can control the operations of the remote propulsion unit by comparing the second identity in the linking signal to the replacement identity that is received onboard the remote propulsion unit, and transmitting a confirmation signal from the remote propulsion unit to the second lead propulsion unit that confirms that the second lead propulsion unit can control the operations of the remote propulsion unit.

In another aspect, at least one of transmitting the linking signal, transmitting the de-linking signal, or transmitting the replacement linking signal occurs over a wireless connection between the remote propulsion unit and one or more of the first lead propulsion unit or the second lead propulsion unit.

In another aspect, at least one of transmitting the linking signal, transmitting the de-linking signal, or transmitting the replacement linking signal occurs over a wired connection between the remote propulsion unit and one or more of the first lead propulsion unit or the second lead propulsion unit.

In another aspect, the method also includes storing the replacement identity in a memory disposed onboard the remote propulsion unit so that the replacement identity in the de-linking signal can be compared to the second identity in the replacement linking signal when the replacement linking signal is received.

In another aspect, the remote propulsion unit and the second lead propulsion unit are controllably linked in a distributed power system when the second identity in the replacement linking signal corresponds to the replacement identity in the de-linking signal.

In another aspect, transmitting the de-linking signal to the remote propulsion unit notifies the remote propulsion unit that the first propulsion unit is to be mechanically decoupled from the vehicle consist.

In one embodiment, method (e.g., for controllably linking a remote propulsion unit with a lead propulsion unit in a vehicle consist) includes receiving a linking signal from a first lead propulsion unit of a vehicle consist at a remote propulsion unit of the vehicle consist. The linking signal includes a first identity of the first lead propulsion unit. The method also includes transmitting a first confirmation signal from the remote propulsion unit to the first lead propulsion unit to controllably link the remote propulsion unit with the first lead propulsion unit. The first confirmation signal is transmitted when the first identity of the first lead propulsion unit in the linking signal corresponds to a designated identity that is stored onboard the remote propulsion unit. The remote propulsion unit allows the first lead propulsion unit to remotely control operations of the remote propulsion unit when the first lead propulsion unit and the remote propulsion unit are controllably linked.

The method further includes receiving a de-linking signal from the first lead propulsion unit at the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The method also includes receiving a replacement linking signal from a second lead propulsion unit at the remote propulsion unit, the replacement linking signal including a second identity of the second lead propulsion unit, and transmitting a second confirmation signal from the remote propulsion unit to the second lead propulsion unit to controllably link the remote propulsion unit with the second lead propulsion unit, the second confirmation signal transmitted when the second identity of the second lead propulsion unit corresponds to the replacement identity in the de-linking signal that is received at the remote propulsion unit. The remote propulsion unit allows the second lead propulsion unit to remotely control the operations of the remote propulsion unit when the second lead propulsion unit and the remote propulsion unit are controllably linked.

In another aspect, receiving the linking signal occurs when both the first lead propulsion unit and the remote propulsion unit are mechanically coupled with the vehicle consist.

In another aspect, the method also includes receiving the designated identity into a memory disposed onboard the remote propulsion unit.

In another aspect, the method also includes confirming that the second lead propulsion unit can control the operations of the remote propulsion unit by comparing the second identity in the linking signal to the replacement identity that is received onboard the remote propulsion unit, wherein transmitting the second confirmation signal is performed when the second identity corresponds to the replacement identity.

In another aspect, at least one of receiving the linking signal, receiving the de-linking signal, or receiving the replacement linking signal occurs over a wireless connection between the remote propulsion unit and one or more of the first lead propulsion unit or the second lead propulsion unit.

In another aspect, at least one of receiving the linking signal, receiving the de-linking signal, or receiving the replacement linking signal occurs over a wired connection between the remote propulsion unit and one or more of the first lead propulsion unit or the second lead propulsion unit.

In another aspect, the method further includes storing the replacement identity in a memory disposed onboard the remote propulsion unit so that the replacement identity can be compared to the second identity in the replacement linking signal when the replacement linking signal is received.

In another aspect, the remote propulsion unit and the second lead propulsion unit are controllably linked in a distributed power system when the second identity in the replacement linking signal corresponds to the replacement identity in the de-linking signal.

In another aspect, the de-linking signal notifies the remote propulsion unit that the first propulsion unit is to be mechanically decoupled from the vehicle consist.

In one embodiment, a method (e.g., for de-linking a lead propulsion unit from a remote propulsion unit in a vehicle consist) includes, in the vehicle consist having plural propulsion units configured to propel the vehicle consist, transmitting a linking signal from a lead propulsion unit of the propulsion units to a remote propulsion unit of the propulsion units, the linking signal including a first identity of the lead propulsion unit. The method also includes controllably linking the remote propulsion unit with the lead propulsion unit when the first identity of the lead propulsion unit in the linking signal corresponds to a designated identity that is stored onboard the remote propulsion unit. The remote propulsion unit allows the lead propulsion unit to remotely control operations of the remote propulsion unit when the lead propulsion unit and the remote propulsion unit are controllably linked. The method further includes transmitting a de-linking signal from the lead propulsion unit to the remote propulsion unit when the lead propulsion unit is to be mechanically decoupled from the vehicle consist. The de-linking signal includes a replacement identity of a propulsion unit other than the lead propulsion unit that is to be mechanically coupled to the vehicle consist to replace the lead propulsion unit. The replacement identity is transmitted to the remote propulsion unit to permit the remote propulsion unit to verify which of the propulsion units in the vehicle consist can remotely control operations of the remote propulsion unit.

In another aspect, the de-linking signal notifies the remote propulsion unit that the first propulsion unit is to be mechanically decoupled from the vehicle consist.

In another aspect, the propulsion units of the vehicle consist are controllably linked with each other in a distributed power system when the remote propulsion unit verifies that the lead propulsion unit can control operations of the remote propulsion unit.

In another aspect, transmitting the de-linking signal occurs over a wireless connection between the remote propulsion unit and the lead propulsion unit.

In another aspect, transmitting the de-linking signal occurs over a wired connection between the remote propulsion unit and the lead propulsion unit.

In another aspect, at least one of the propulsion units other than the lead propulsion unit can control the operations of the remote propulsion unit only when the replacement identity that is transmitted in the de-linking signal corresponds to a second identity of the at least one of the propulsion units.

In one embodiment, a system (e.g., a communication system of a vehicle consist) includes first, second, and third communication interfaces and a setup device. The first communication interface is configured to be disposed onboard a first lead propulsion unit of a vehicle consist. The first communication interface is configured to transmit a linking signal from the first lead propulsion unit to a remote propulsion unit of the vehicle consist. The linking signal includes a first identity of the first lead propulsion unit. The second communication interface is configured to be disposed onboard the remote propulsion unit and to receive the linking signal from the first lead propulsion unit. The setup unit is configured to be disposed onboard the remote propulsion unit and to direct the second communication interface to controllably link with the first communication interface of the first lead propulsion unit when the first identity of the first lead propulsion unit in the linking signal corresponds to a designated identity that is stored onboard the remote propulsion unit.

The setup unit allows the remote propulsion unit to be remotely controlled by the first lead propulsion unit when the first and second communication interfaces are controllably linked. The first communication interface is configured to transmit a de-linking signal from the first lead propulsion unit to the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit.

The third communication interface is configured to be disposed onboard a second lead propulsion unit of the vehicle consist. The third communication interface is configured to transmit a replacement linking signal to the remote propulsion unit that includes a second identity of the second lead propulsion unit. The setup unit is configured to controllably link the remote propulsion unit with the second lead propulsion unit when the second identity of the second lead propulsion unit corresponds to the replacement identity in the de-linking signal that is received at the remote propulsion unit. The setup unit also is configured to allow the second lead propulsion unit to remotely control operations of the remote propulsion unit when the second lead propulsion unit and the remote propulsion unit are controllably linked.

In another aspect, the first communication interface is configured to transmit the linking signal when both the first lead propulsion unit and the remote propulsion unit are mechanically coupled with the vehicle consist.

In another aspect, the system also includes a memory configured to be disposed onboard the remote propulsion unit and to store the designated identity.

In another aspect, the setup unit is configured to confirm that the second lead propulsion unit can control the operations of the remote propulsion unit by comparing the second identity in the linking signal to the replacement identity that is received onboard the remote propulsion unit. The second communication interface can be configured to transmit a confirmation signal from the remote propulsion unit to the second lead propulsion unit that confirms that the second lead propulsion unit can control the operations of the remote propulsion unit.

In another aspect, at least one of the first communication interface, the second communication interface, or the third communication interface is configured to communicate the linking signal, the de-linking signal, or the replacement linking signal over a wireless connection between the remote propulsion unit and one or more of the first lead propulsion unit or the second lead propulsion unit.

In another aspect, at least one of the first communication interface, the second communication interface, or the third communication interface is configured to communicate the linking signal, the de-linking signal, or the replacement linking signal over a wired connection between the remote propulsion unit and one or more of the first lead propulsion unit or the second lead propulsion unit.

In another aspect, the setup unit is configured to store the replacement identity in a memory disposed onboard the remote propulsion unit so that the replacement identity in the de-linking signal can be compared to the second identity in the replacement linking signal when the replacement linking signal is received.

In another aspect, the setup unit controllably links the remote propulsion unit and the second lead propulsion unit in a distributed power system when the second identity in the replacement linking signal corresponds to the replacement identity in the de-linking signal.

In another aspect, the first communication unit is configured to transmit the de-linking signal to the remote propulsion unit in order to notify the remote propulsion unit that the first propulsion unit is to be mechanically decoupled from the vehicle consist.

In one embodiment, a system (e.g., a communication system of a remote propulsion unit in a vehicle consist) includes a communication interface and a setup unit. The communication interface is configured to be disposed onboard a remote propulsion unit of a vehicle consist and to receive a linking signal from a first lead propulsion unit of the vehicle consist that includes a first identity of the first lead propulsion unit. The setup unit is configured to be disposed onboard the remote propulsion unit and to controllably link the remote propulsion unit with the first lead propulsion unit when the first identity of the first lead propulsion unit in the linking signal corresponds to a designated identity that is stored onboard the remote propulsion unit. The setup unit is configured to allow the first lead propulsion unit to remotely control operations of the remote propulsion unit when the first lead propulsion unit and the remote propulsion unit are controllably linked. In one aspect, the setup unit can prevent the first lead propulsion unit from remotely controlling operations of the remote propulsion unit when the remote propulsion unit is not controllably linked with the first lead propulsion unit.

The communication interface is configured to receive a de-linking signal from the first lead propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The communication interface also is configured to receive a replacement linking signal from a second lead propulsion unit at the remote propulsion unit, the replacement linking signal including a second identity of the second lead propulsion unit. The setup unit is further configured to allow the remote propulsion unit to be controlled by the second lead propulsion unit when the second identity of the second lead propulsion unit corresponds to the replacement identity in the de-linking signal that is received at the remote propulsion unit.

In another aspect, the communication unit is configured to receive the linking signal when both the first lead propulsion unit and the remote propulsion unit are mechanically coupled with the vehicle consist.

In another aspect, the system also includes a memory configured to be disposed onboard the remote propulsion unit and to store the designated identity.

In another aspect, the setup unit is configured to confirm that the second lead propulsion unit can control the operations of the remote propulsion unit by comparing the second identity in the linking signal to the replacement identity that is received onboard the remote propulsion unit.

In another aspect, the remote propulsion unit and the second lead propulsion unit are controllably linked in a distributed power system by the setup unit when the second identity in the replacement linking signal corresponds to the replacement identity in the de-linking signal.

In one embodiment, a system (e.g., a communication system of a lead propulsion unit in a vehicle consist) includes a communication interface that is configured to be disposed onboard the lead propulsion unit of the vehicle consist having plural propulsion units configured to propel the vehicle consist. The communication interface is configured to transmit transmitting a linking signal to a remote propulsion unit of the propulsion units, the linking signal including a first identity of the lead propulsion unit. A setup unit that is onboard the remote propulsion unit controllably links the remote propulsion unit with the lead propulsion unit when the first identity of the lead propulsion unit in the linking signal corresponds to a designated identity that is stored onboard the remote propulsion unit. The remote propulsion unit allows the lead propulsion unit to remotely control operations of the remote propulsion unit when the lead propulsion unit and the remote propulsion unit are controllably linked.

The communication interface also is configured to transmit a de-linking signal to the remote propulsion unit when the lead propulsion unit is to be mechanically decoupled from the vehicle consist. The de-linking signal including a replacement identity of a propulsion unit other than the lead propulsion unit that is to be mechanically coupled to the vehicle consist to replace the lead propulsion unit. The replacement identity is transmitted to the remote propulsion unit to permit the remote propulsion unit to verify which of the propulsion units in the vehicle consist can remotely control operations of the remote propulsion unit.

In another aspect, the de-linking signal notifies the remote propulsion unit that the first propulsion unit is to be mechanically decoupled from the vehicle consist.

In another aspect, the propulsion units of the vehicle consist are controllably linked with each other in a distributed power system.

In one embodiment, a method (e.g., for controllably linking propulsion units, or propulsion units, in a vehicle consist) includes transmitting a linking signal from a first lead propulsion unit of a vehicle consist to a remote propulsion unit of the vehicle consist. The linking signal includes a first identity of the first lead propulsion unit. The remote propulsion unit and the first lead propulsion unit are controllably linked with each other when the first identity of the first lead propulsion unit in the linking signal corresponds to a designated identity that is stored onboard the remote propulsion unit. The remote propulsion unit allows the first lead propulsion unit to remotely control operations of the remote propulsion unit when the first lead propulsion unit and the remote propulsion unit are controllably linked. The method also includes transmitting a de-linking signal from the first lead propulsion unit to the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The method further includes transmitting a replacement linking signal from a second lead propulsion unit to the remote propulsion unit. The replacement linking signal includes a second identity of the second lead propulsion unit. The remote propulsion unit and the second lead propulsion unit are controllably linked when the second identity of the second lead propulsion unit corresponds to the replacement identity received at the remote propulsion unit. The remote propulsion unit allows the second lead propulsion unit to remotely control the operations of the remote propulsion unit when the second lead propulsion unit and the remote propulsion unit are controllably linked.

In one aspect, the remote propulsion unit prevents the first lead propulsion unit from remotely controlling operations of the remote propulsion unit when the remote propulsion unit is not controllably linked with the first lead propulsion unit.

In one aspect, the remote propulsion unit prevents the second lead propulsion unit from remotely controlling operations of the remote propulsion unit when the remote propulsion unit is not controllably linked with the second lead propulsion unit.

In another aspect, transmitting the linking signal occurs when both the first lead propulsion unit and the remote propulsion unit are mechanically coupled with the vehicle consist.

In another aspect, the method also includes inputting the designated identity into a memory disposed onboard the remote propulsion unit.

In another aspect, the method further includes confirming that the second lead propulsion unit can control the operations of the remote propulsion unit by comparing the second identity in the linking signal to the replacement identity that is received onboard the remote propulsion unit, and transmitting a confirmation signal from the remote propulsion unit to the second lead propulsion unit that confirms that the second lead propulsion unit can control the operations of the remote propulsion unit.

In another aspect, at least one of transmitting the linking signal, transmitting the de-linking signal, or transmitting the replacement linking signal occurs over a wireless connection between the remote propulsion unit and one or more of the first lead propulsion unit or the second lead propulsion unit.

In another aspect, at least one of transmitting the linking signal, transmitting the de-linking signal, or transmitting the replacement linking signal occurs over a wired connection between the remote propulsion unit and one or more of the first lead propulsion unit or the second lead propulsion unit.

In another aspect, the method also includes storing the replacement identity in a memory disposed onboard the remote propulsion unit so that the replacement identity in the de-linking signal can be compared to the second identity in the replacement linking signal when the replacement linking signal is received.

In another aspect, the remote propulsion unit and the second lead propulsion unit are controllably linked in a distributed power system when the second identity in the replacement linking signal corresponds to the replacement identity in the de-linking signal.

In another aspect, transmitting the de-linking signal to the remote propulsion unit notifies the remote propulsion unit that the first propulsion unit is to be mechanically decoupled from the vehicle consist.

In one embodiment, method (e.g., for controllably linking a remote propulsion unit with a lead propulsion unit in a vehicle consist) includes receiving a linking signal from a first lead propulsion unit of a vehicle consist at a remote propulsion unit of the vehicle consist. The linking signal includes a first identity of the first lead propulsion unit. The method also includes transmitting a first confirmation signal from the remote propulsion unit to the first lead propulsion unit to controllably link the remote propulsion unit with the first lead propulsion unit. The first confirmation signal is transmitted when the first identity of the first lead propulsion unit in the linking signal corresponds to a designated identity that is stored onboard the remote propulsion unit. The remote propulsion unit allows the first lead propulsion unit to remotely control operations of the remote propulsion unit when the first lead propulsion unit and the remote propulsion unit are controllably linked.

The method further includes receiving a de-linking signal from the first lead propulsion unit at the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The method also includes receiving a replacement linking signal from a second lead propulsion unit at the remote propulsion unit, the replacement linking signal including a second identity of the second lead propulsion unit, and transmitting a second confirmation signal from the remote propulsion unit to the second lead propulsion unit to controllably link the remote propulsion unit with the second lead propulsion unit, the second confirmation signal transmitted when the second identity of the second lead propulsion unit corresponds to the replacement identity in the de-linking signal that is received at the remote propulsion unit. The remote propulsion unit allows the second lead propulsion unit to remotely control the operations of the remote propulsion unit when the second lead propulsion unit and the remote propulsion unit are controllably linked.

In another aspect, receiving the linking signal occurs when both the first lead propulsion unit and the remote propulsion unit are mechanically coupled with the vehicle consist.

In another aspect, the method also includes receiving the designated identity into a memory disposed onboard the remote propulsion unit.

In another aspect, the method also includes confirming that the second lead propulsion unit can control the operations of the remote propulsion unit by comparing the second identity in the linking signal to the replacement identity that is received onboard the remote propulsion unit, wherein transmitting the second confirmation signal is performed when the second identity corresponds to the replacement identity.

In another aspect, at least one of receiving the linking signal, receiving the de-linking signal, or receiving the replacement linking signal occurs over a wireless connection between the remote propulsion unit and one or more of the first lead propulsion unit or the second lead propulsion unit.

In another aspect, at least one of receiving the linking signal, receiving the de-linking signal, or receiving the replacement linking signal occurs over a wired connection between the remote propulsion unit and one or more of the first lead propulsion unit or the second lead propulsion unit.

In another aspect, the method further includes storing the replacement identity in a memory disposed onboard the remote propulsion unit so that the replacement identity can be compared to the second identity in the replacement linking signal when the replacement linking signal is received.

In another aspect, the remote propulsion unit and the second lead propulsion unit are controllably linked in a distributed power system when the second identity in the replacement linking signal corresponds to the replacement identity in the de-linking signal.

In another aspect, the de-linking signal notifies the remote propulsion unit that the first propulsion unit is to be mechanically decoupled from the vehicle consist.

In one embodiment, a method (e.g., for de-linking a lead propulsion unit from a remote propulsion unit in a vehicle consist) includes, in the vehicle consist having plural propulsion units configured to propel the vehicle consist, transmitting a linking signal from a lead propulsion unit of the propulsion units to a remote propulsion unit of the propulsion units, the linking signal including a first identity of the lead propulsion unit. The method also includes controllably linking the remote propulsion unit with the lead propulsion unit when the first identity of the lead propulsion unit in the linking signal corresponds to a designated identity that is stored onboard the remote propulsion unit. The remote propulsion unit allows the lead propulsion unit to remotely control operations of the remote propulsion unit when the lead propulsion unit and the remote propulsion unit are controllably linked. The method further includes transmitting a de-linking signal from the lead propulsion unit to the remote propulsion unit when the lead propulsion unit is to be mechanically decoupled from the vehicle consist. The de-linking signal includes a replacement identity of a propulsion unit other than the lead propulsion unit that is to be mechanically coupled to the vehicle consist to replace the lead propulsion unit. The replacement identity is transmitted to the remote propulsion unit to permit the remote propulsion unit to verify which of the propulsion units in the vehicle consist can remotely control operations of the remote propulsion unit.

In another aspect, the de-linking signal notifies the remote propulsion unit that the first propulsion unit is to be mechanically decoupled from the vehicle consist.

In another aspect, the propulsion units of the vehicle consist are controllably linked with each other in a distributed power system.

In another aspect, transmitting the de-linking signal occurs over a wireless connection between the remote propulsion unit and the lead propulsion unit.

In another aspect, transmitting the de-linking signal occurs over a wired connection between the remote propulsion unit and the lead propulsion unit.

In another aspect, at least one of the propulsion units other than the lead propulsion unit can control the operations of the remote propulsion unit only when the replacement identity that is transmitted in the de-linking signal corresponds to a second identity of the at least one of the propulsion units.

In one embodiment, a system (e.g., a communication system of a vehicle consist) includes first, second, and third communication interfaces and a setup device. The first communication interface is configured to be disposed onboard a first lead propulsion unit of a vehicle consist. The first communication interface is configured to transmit a linking signal from the first lead propulsion unit to a remote propulsion unit of the vehicle consist. The linking signal includes a first identity of the first lead propulsion unit. The second communication interface is configured to be disposed onboard the remote propulsion unit and to receive the linking signal from the first lead propulsion unit. The setup unit is configured to be disposed onboard the remote propulsion unit and to direct the second communication interface to controllably link with the first communication interface of the first lead propulsion unit when the first identity of the first lead propulsion unit in the linking signal corresponds to a designated identity that is stored onboard the remote propulsion unit.

The setup unit allows the remote propulsion unit to be remotely controlled by the first lead propulsion unit when the first and second communication interfaces are controllably linked. The first communication interface is configured to transmit a de-linking signal from the first lead propulsion unit to the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit.

The third communication interface is configured to be disposed onboard a second lead propulsion unit of the vehicle consist. The third communication interface is configured to transmit a replacement linking signal to the remote propulsion unit that includes a second identity of the second lead propulsion unit. The setup unit is configured to controllably link the remote propulsion unit with the second lead propulsion unit when the second identity of the second lead propulsion unit corresponds to the replacement identity in the de-linking signal that is received at the remote propulsion unit. The setup unit also is configured to allow the second lead propulsion unit to remotely control operations of the remote propulsion unit when the second lead propulsion unit and the remote propulsion unit are controllably linked.

In another aspect, the first communication interface is configured to transmit the linking signal when both the first lead propulsion unit and the remote propulsion unit are mechanically coupled with the vehicle consist.

In another aspect, the system also includes a memory configured to be disposed onboard the remote propulsion unit and to store the designated identity.

In another aspect, the setup unit is configured to confirm that the second lead propulsion unit can control the operations of the remote propulsion unit by comparing the second identity in the linking signal to the replacement identity that is received onboard the remote propulsion unit. The second communication interface can be configured to transmit a confirmation signal from the remote propulsion unit to the second lead propulsion unit that confirms that the second lead propulsion unit can control the operations of the remote propulsion unit.

In another aspect, at least one of the first communication interface, the second communication interface, or the third communication interface is configured to communicate the linking signal, the de-linking signal, or the replacement linking signal over a wireless connection between the remote propulsion unit and one or more of the first lead propulsion unit or the second lead propulsion unit.

In another aspect, at least one of the first communication interface, the second communication interface, or the third communication interface is configured to communicate the linking signal, the de-linking signal, or the replacement linking signal over a wired connection between the remote propulsion unit and one or more of the first lead propulsion unit or the second lead propulsion unit.

In another aspect, the setup unit is configured to store the replacement identity in a memory disposed onboard the remote propulsion unit so that the replacement identity in the de-linking signal can be compared to the second identity in the replacement linking signal when the replacement linking signal is received.

In another aspect, the setup unit controllably links the remote propulsion unit and the second lead propulsion unit in a distributed power system when the second identity in the replacement linking signal corresponds to the replacement identity in the de-linking signal.

In another aspect, the first communication unit is configured to transmit the de-linking signal to the remote propulsion unit in order to notify the remote propulsion unit that the first propulsion unit is to be mechanically decoupled from the vehicle consist.

In one embodiment, a system (e.g., a communication system of a remote propulsion unit in a vehicle consist) includes a communication interface and a setup unit. The communication interface is configured to be disposed onboard a remote propulsion unit of a vehicle consist and to receive a linking signal from a first lead propulsion unit of the vehicle consist that includes a first identity of the first lead propulsion unit. The setup unit is configured to be disposed onboard the remote propulsion unit and to controllably link the remote propulsion unit with the first lead propulsion unit when the first identity of the first lead propulsion unit in the linking signal corresponds to a designated identity that is stored onboard the remote propulsion unit. The setup unit allows the first lead propulsion unit to remotely control operations of the remote propulsion unit when the first lead propulsion unit and the remote propulsion unit are controllably linked. In one aspect, the setup unit can prevent the first lead propulsion unit from remotely controlling operations of the remote propulsion unit when the remote propulsion unit is not controllably linked with the first lead propulsion unit.

The communication interface is configured to receive a de-linking signal from the first lead propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The communication interface also is configured to receive a replacement linking signal from a second lead propulsion unit at the remote propulsion unit, the replacement linking signal including a second identity of the second lead propulsion unit. The setup unit is further configured to allow the remote propulsion unit to be controlled by the second lead propulsion unit when the second identity of the second lead propulsion unit corresponds to the replacement identity in the de-linking signal that is received at the remote propulsion unit.

In another aspect, the communication unit is configured to receive the linking signal when both the first lead propulsion unit and the remote propulsion unit are mechanically coupled with the vehicle consist.

In another aspect, the system also includes a memory configured to be disposed onboard the remote propulsion unit and to store the designated identity.

In another aspect, the setup unit is configured to confirm that the second lead propulsion unit can control the operations of the remote propulsion unit by comparing the second identity in the linking signal to the replacement identity that is received onboard the remote propulsion unit.

In another aspect, the remote propulsion unit and the second lead propulsion unit are controllably linked in a distributed power system by the setup unit when the second identity in the replacement linking signal corresponds to the replacement identity in the de-linking signal.

In one embodiment, a system (e.g., a communication system of a lead propulsion unit in a vehicle consist) includes a communication interface that is configured to be disposed onboard the lead propulsion unit of the vehicle consist having plural propulsion units configured to propel the vehicle consist. The communication interface is configured to transmit transmitting a linking signal to a remote propulsion unit of the propulsion units, the linking signal including a first identity of the lead propulsion unit. A setup unit that is onboard the remote propulsion unit controllably links the remote propulsion unit with the lead propulsion unit when the first identity of the lead propulsion unit in the linking signal corresponds to a designated identity that is stored onboard the remote propulsion unit. The remote propulsion unit allows the lead propulsion unit to remotely control operations of the remote propulsion unit when the lead propulsion unit and the remote propulsion unit are controllably linked.

The communication interface also is configured to transmit a de-linking signal to the remote propulsion unit when the lead propulsion unit is to be mechanically decoupled from the vehicle consist. The de-linking signal including a replacement identity of a propulsion unit other than the lead propulsion unit that is to be mechanically coupled to the vehicle consist to replace the lead propulsion unit. The replacement identity is transmitted to the remote propulsion unit to permit the remote propulsion unit to verify which of the propulsion units in the vehicle consist can remotely control operations of the remote propulsion unit.

In another aspect, the de-linking signal notifies the remote propulsion unit that the first propulsion unit is to be mechanically decoupled from the vehicle consist.

In another aspect, the propulsion units of the vehicle consist are controllably linked with each other in a distributed power system.

In another embodiment, a system (e.g., for controllably linking propulsion units) includes a control unit having a first communication interface and a first setup unit operably coupled with the first communication interface. The control unit is configured to be disposed onboard a first propulsion unit of a vehicle consist. The control unit is configured to operate in at least a first mode of operation, a different, second mode of operation, and a different, third mode of operation. When in the first mode of operation, the control unit is configured to transmit a first linking signal to a second propulsion unit in the vehicle consist. The first linking signal includes a first identity of the first propulsion unit for the first propulsion unit to control the second propulsion unit if the first identity corresponds to a first designated identity that is stored onboard the second propulsion unit. When in the second mode of operation, the control unit is configured to transmit a first de-linking signal to the second propulsion unit when the first propulsion unit is to be mechanically decoupled from the vehicle consist. The first de-linking signal includes a first replacement identity of a third propulsion unit that is to be mechanically coupled to the vehicle consist to replace the first propulsion unit, for the third propulsion unit to control the second propulsion unit if a second identity received by the second propulsion unit from the third propulsion unit in a second linking signal matches the first replacement identity. When in the third mode of operation, the control unit is configured to receive a third linking signal from the second propulsion unit, a second de-linking signal from the second propulsion unit, or a fourth linking signal from the third propulsion unit. When in the third mode of operation, the control unit also is configured to allow the second propulsion unit to control the first propulsion unit if a third identity in the third linking signal corresponds to a second designated identity stored onboard the first propulsion unit, or to allow the third propulsion unit to control the first propulsion unit if a fourth identity in the fourth linking signal corresponds to a second replacement identity received in the second de-linking signal from the second propulsion unit.

One or more embodiments of the inventive subject matter described herein provides for methods and systems for establishing communication links between propulsion-generating vehicles in a vehicle system that includes two or more of the propulsion-generating vehicles coupled with each other. For example, embodiments of the inventive subject matter may be used in connection with rail vehicles and rail vehicle consists, or other types of vehicles. In one aspect, remote propulsion-generating vehicles are configured to receive a wireless link command message from one or more lead propulsion-generating vehicles, as long as the link command message includes a remote vehicle identifier (e.g., a road number), or the identifier and name of the remote vehicle. The link command message optionally can include the orientation of the remote vehicle relative to the lead vehicle, such as facing the same direction or facing opposite directions. The lead vehicle can send (e.g., broadcast) a link command message that includes the remote vehicle identifiers of one or more remote vehicles that are to be included in the same vehicle consist as the lead vehicle.

Optionally, this link command message can include the name of the vehicle consist and/or the orientation of the remote vehicle relative to the lead vehicle. Each of the remote vehicles that receive the link command message can examine the link command message to determine if the link command message includes a remote vehicle identifier that matches the identifier of the remote vehicle and/or a consist name that matches a designated consist name stored at the remote vehicle. If the identifiers and/or consist names match, then the remote vehicle may establish a communication link with the lead vehicle. For example, the remote vehicle may communicate a link reply message to the lead vehicle (to confirm receipt of the link command message) and begin accepting command messages from the lead vehicle that cause the remote vehicle to change operational settings (e.g., throttle settings, brake settings, etc.) where, prior to establishing the communication link, the remote vehicle would not accept and operate according to such command messages. The remote vehicle optionally may take the orientation included in the link command message and use this orientation to determine how to operate according to the command messages received from the lead vehicle.

In another embodiment, the remote vehicles may each be configured to store a lead vehicle identifier onboard the remote vehicles. This identifier can represent which of several different lead vehicles that the remote vehicle can receive command messages from and operate according to. The lead vehicle may then send (e.g., broadcast) a link command message that includes the lead vehicle identifier. This message may not include the consist name and/or the identifiers of the remote vehicles. Alternatively, the message may include the consist name and/or the identifier of one or more of the remote vehicles. Upon receipt of the command link message at the remote vehicles, the remote vehicles can communicate link reply messages to the lead vehicle to establish communication links with the lead vehicle. Establishing the communication links between the lead and remote vehicles according to one or more embodiments described herein can reduce the amount of time needed to prepare the consist for travel by eliminating some travel of an operator to the remote vehicles to set the remote vehicles up for distributed power operations. Additionally, human error in setting up the vehicles can be reduced by reducing the number of times the operator has to input identifiers, consist names, or the like.

Figure 12:
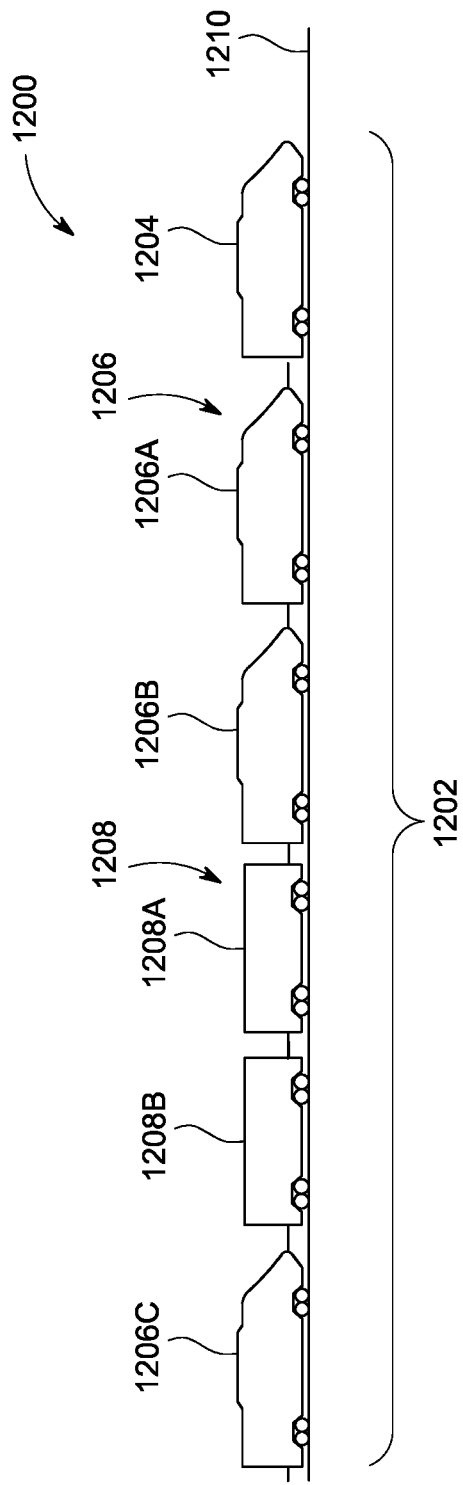
FIG. 12 is a schematic view of one embodiment of a communication system of a vehicle consist or vehicle system.

FIG. 12 is a schematic view of one embodiment of a communication system 1200 of a vehicle consist or vehicle system 1202. The illustrated vehicle consist 1202 includes propulsion-generating vehicles 1204, 1206 (e.g., vehicles 1204, 1206A, 1206B, 1206C) and non-propulsion-generating vehicles 1208 (e.g., vehicles 1208A, 1208B) mechanically coupled with each other. The propulsion-generating vehicles are capable of self-propulsion while the non-propulsion-generating vehicles are not capable of self-propulsion. The propulsion-generating vehicles 1204, 1206 are shown as locomotives, the non-propulsion-generating vehicles 1208 are shown as rail cars, and the vehicle consist 1202 is shown as a train in the illustrated embodiment. Alternatively, the vehicles 1204, 1206 may represent other vehicles, such as automobiles, marine vessels, or the like, and the vehicle consist 1202 can represent a grouping or coupling of these other vehicles. In one embodiment, the vehicles 1204, 1206 may not be mechanically coupled with each other. For example, the vehicles 1204, 1206 may be separate from each other, but may communicate with each other to coordinate operations of the vehicles 1204, 1206. For example, the vehicle 1204 may wirelessly communicate operational command messages to the vehicles 1206 that remotely control or direct operational settings of the vehicles 1206 so that the vehicles 1204, 1206 can remain designated distances from each other or otherwise travel together. The number and arrangement of the vehicles 1204, 1206 in the vehicle consist 1202 are provided as one example and are not intended as limitations on all embodiments of the inventive subject matter described herein.

The vehicles 1204, 1206 can be arranged in a distributed power (DP) arrangement. For example, the vehicles 1204, 1206 can include a lead vehicle 1204 that issues command messages to the other vehicles 1206A, 1206B, 1206C which are referred to herein as remote vehicles. The designations "lead" and "remote" are not intended to denote spatial locations of the vehicles 1204, 1206 in the vehicle consist 1202, but instead are used to indicate which vehicle 1204, 1206 is communicating (e.g., transmitting, broadcasting, or a combination of transmitting and broadcasting) operational command messages and which vehicles 1204, 1206 are being remotely controlled using the operational command messages. For example, the lead vehicle 1204 may or may not be disposed at the front end of the vehicle consist 1202 (e.g., along a direction of travel of the vehicle consist 1202). Additionally, the remote vehicles 1206A-C need not be separated from the lead vehicle 1204. For example, a remote vehicle 1206A-C may be directly coupled with the lead vehicle 1204 or may be separated from the lead vehicle 1204 by one or more other remote vehicles 1206A-C and/or vehicles 1208.

The operational command messages may include directives that direct operations of the remote vehicles. These directives can include propulsion commands that direct propulsion subsystems of the remote vehicles to move at a designated speed and/or power level, brake commands that direct the remote vehicles to apply brakes at a designated level, and/or other commands. The lead vehicle 1204 issues the command messages to coordinate the tractive efforts and/or braking efforts provided by the vehicles 1204, 1206 in order to propel the vehicle consist 1202 along a route 1210, such as a track, road, waterway, or the like.

The operational command messages can be communicated using the communication system 1200, as described below. In one embodiment, the operational command messages are wirelessly communicated using the communication system 1200. Prior to communicating the operational command messages, the vehicles 1204, 1206 may need to be communicatively coupled with each other. For example, one or more communication links may need to be established between the vehicles 1204, 1206 before the vehicles 1206 will operate according to the operational command messages. A communication link may be established between the lead vehicle 1204 and the remote vehicle 1206 responsive to a link command message being communicated between the vehicles 1204, 1206 that correctly identifies the other of the vehicles 1204, 1206 (e.g., the message identifies the vehicle 1204, 1206 that is sending the message and/or the vehicle 1204, 1206 that is receiving the message) and the vehicle 1204, 1206 that receives the link command message communicating a reply link message to confirm receipt of the link command message.

The messages can identify the vehicles 1204, 1206 by a vehicle identifier. The vehicle identifier can represent a unique numeric and/or alphanumeric sequence or code that distinguishes one vehicle 1204, 1206 from other vehicles 1204, 1206. Alternatively, a vehicle identifier may identify two or more vehicles 1204, 1206 differently from one or more other vehicles 1204, 1206. For example, a vehicle identifier can represent a type of vehicle, a group of vehicles, or the like.

Optionally, the messages may identify vehicles 1204, 1206 by a consist name. A consist name can represent a unique numeric and/or alphanumeric sequence or code that distinguishes one vehicle consist 1202 from other vehicle consists 1202. For example, in a vehicle yard such as a rail yard, several vehicle consists 1202 may be relatively close to each other such that the vehicles 1204, 1206 in the different vehicle consists 1202 are able to wirelessly communicate with each other. To prevent the vehicles 1204, 1206 in one vehicle consist 1202 from mistakenly communicating with a vehicle 1204, 1206 in another vehicle consist 1202 (e.g., such as by operating according to operational command messages from another vehicle consist 1202), the messages optionally may include a consist name to identify which vehicle consist 1202 that the messages are associated with.

Figure 13:
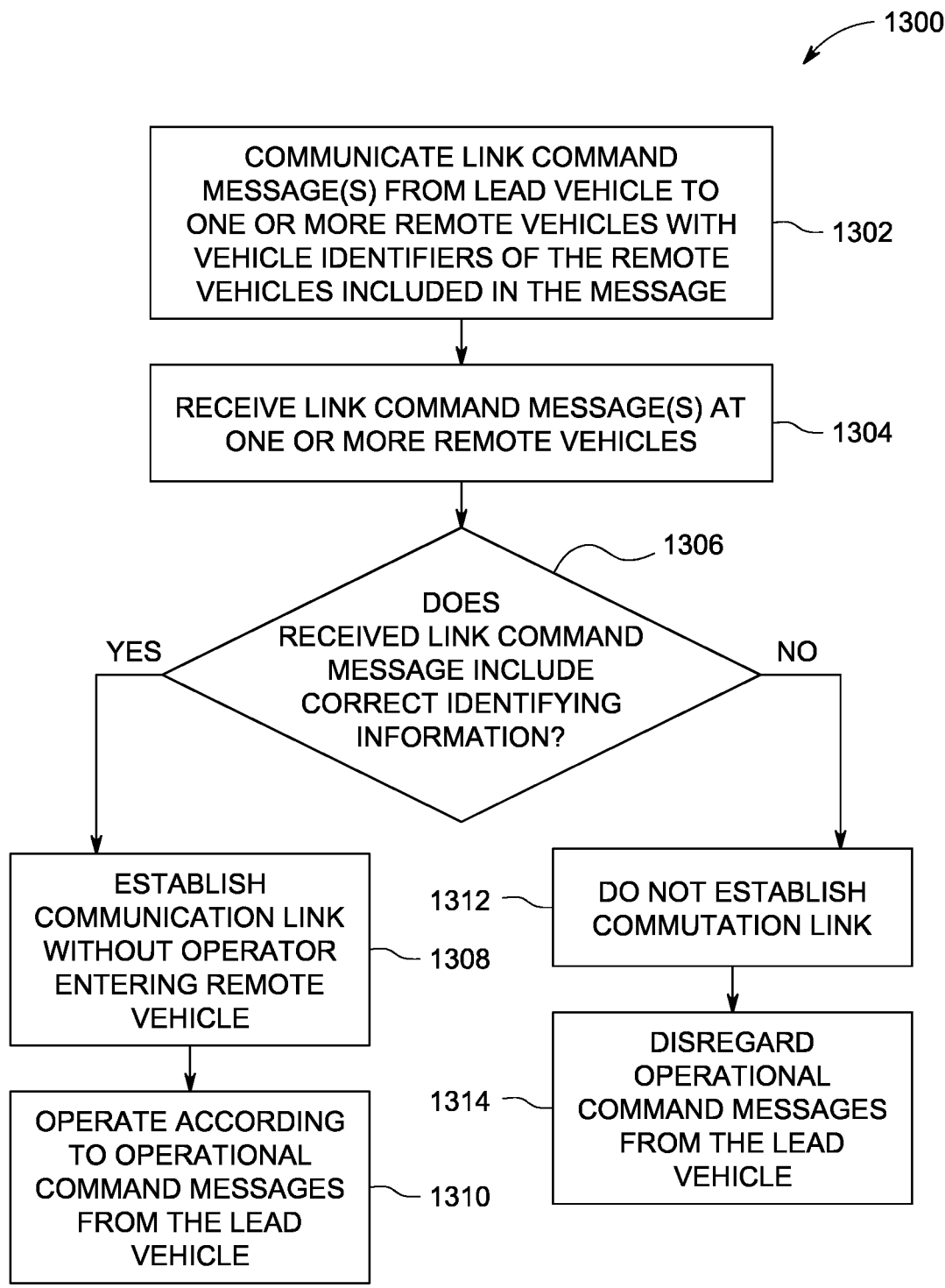
FIG. 13 illustrates a flowchart of one embodiment of a method for communicatively coupling vehicles in the vehicle consist shown in FIG. 12.

FIG. 13 illustrates a flowchart of one embodiment of a method 1300 for communicatively coupling vehicles 1204, 1206 in the vehicle consist shown in FIG. 12. The method 1300 may be used to establish communication links between the vehicles 1204, 1206 so that the lead vehicle 1204 can coordinate tractive efforts and/or braking efforts provided by the vehicles 1206. For example, the method 1300 may be used to set up the vehicles 1204, 1206 to operate in a distributed power (DP) mode. The method 1300 can be used to establish the communication links between the vehicles 1204, 1206 without an operator having to travel to and/or board the remote vehicles 1206.

At 1302, one or more link command messages are communicated to the remote vehicles 1206. The link command message(s) may be broadcast from the lead vehicle 1204 to the remote vehicles 1206. Alternatively, the link command message(s) may be communicated from another source, such as a tower, a dispatch center, a remote control device (e.g., an operator control unit), or the like. The link command message(s) can be wirelessly transmitted and/or broadcast. Prior to communicating the link command message(s), the vehicles 1204, 1206 may not be communicatively coupled. For example, the vehicles 1206 may not be set up to operate according to operational command messages received from the lead vehicle 1204.

The link command message(s) include a vehicle identifier of one or more of the remote vehicles 1206. For example, the link command message(s) can include unique identifiers of the plural remote vehicles 1206 that are to be included in the vehicle consist 1202. Alternatively, each of the link command messages can include a single vehicle identifier of a single remote vehicle 1206 that is to be included in the vehicle consist 1202. Several link command messages may be sent with each link command message identifying another remote vehicle 1206 so that several remote vehicles 1206.

In one embodiment, the link command message(s) can include a vehicle consist identifier. For example, the link command message(s) can include the vehicle identifiers of the remote consists 1206 that are to be communicatively linked with the lead vehicle 1204 and the vehicle consist identifier of the vehicle consist 1202 that will include the vehicles 1204, 1206. Alternatively, the link command message(s) may include the vehicle consist identifier and not the vehicle identifiers of the remote vehicles 1206.

At 1304, the link command message(s) are received at the remote vehicles 1206. In one aspect, the link command message(s) may be received by the remote vehicles 1206 that are to be included in the vehicle consist 1202 and one or more other remote vehicles that are not to be included in the vehicle consist 1202. For example, due to the close proximity between several vehicle consists 1202, the remote vehicles 1206 in one or more other vehicle consists may receive the link command message(s) for the vehicle consist 1202 shown in FIG. 12. As a result, both the remote vehicles 1206 in the vehicle consist 1202 and the remote vehicles 1206 that are not in the vehicle consist 1202 may wirelessly receive the link command message(s). Alternatively, the link command message may only be received by the remote vehicles 1206 that are in the vehicle consist 1202.

At 1306, the link command message is examined to determine if the link command message includes correct identifying information. For example, in response to receiving the link command message at a remote vehicle 1206, the remote vehicle 1206 can parse the link command message to determine if the link command message includes one or more types of identifying information that identifies the remote vehicle 1206 and/or the vehicle consist 1202. The vehicle identifiers and/or consist identifiers can be stored onboard the remote vehicles 1206, such as in memories, control units, or the like, of the remote vehicles 1206.

If the link command message includes the correct identifying information, then the remote vehicle 1206 can determine that the remote vehicle 1206 can communicatively link with the lead vehicle 1204 to receive operational command messages from the lead vehicle 1204. As a result, flow of the method 1300 can proceed to 1308. On the other hand, if the link command message does not include the correct identifying information, then the remote vehicle 1206 can determine that the remote vehicle 1206 cannot communicatively link with the lead vehicle 1204 to receive operational command messages from the lead vehicle 1204. As a result, flow of the method 1300 can proceed to 1312. The determination performed at 1306 can be performed onboard each of the remote vehicles 1206 without an operator being onboard the remote vehicles 1206.

In one aspect, the identifying information in the link command message is correct when the link command message includes the vehicle identifier of the remote vehicle 1206 and the consist identifier stored onboard the remote vehicle 1206. For example, if the link command message includes one or more vehicle identifiers, and at least one of the vehicle identifiers matches or otherwise corresponds to the vehicle identifier of the remote vehicle 1206 that received the link command message, then the link command message includes the correct vehicle identifier for that remote vehicle 1206. If the link command message includes a consist identifier that matches or otherwise corresponds to a consist identifier stored onboard the remote vehicle 1206, then the link command message includes the correct consist identifier for that remote vehicle 1206. If either the vehicle identifier or the consist identifier in the link command message does not match or otherwise correspond to the vehicle identifier of the remote vehicle 1206 or the consist identifier stored onboard the remote vehicle 1206 that receives the link command message, then the identifying information in the link command message is not correct. Alternatively, the identifying information may be correct if the link command message includes the vehicle identifier of the remote vehicle 1206. For example, the link command message may not include the consist identifier of the vehicle consist 1202.

The link command message optionally can include an orientation identification of the remote vehicle 1206. The orientation identification indicates the orientation of the remote vehicle 1206 relative to the lead vehicle 1204. For example, the vehicles 1204, 1206 may be facing different directions, which can be referred to as "short hood forward," "long hood forward," forward, backward, or the like. Depending on whether the remote vehicle 1206 that is to be communicatively linked with the lead vehicle 1204 is facing the same or opposite direction of the lead vehicle 1204, operational settings that are communicated to the remote vehicle 1206 by operational command messages from the lead vehicle 1204 may be implemented differently. For example, the direction in which the remote vehicle 1206 is to rotate wheels of the remote vehicle 1206 may change based on whether the remote vehicle 1206 is facing the same or opposite direction of the lead vehicle 1204 in order to avoid stretching or compressing the vehicle consist 1202. The link command message can include the orientation of the remote vehicle 1206 relative to the lead vehicle 1202 so that an operator does not need to travel to the remote vehicle 1206 and manually provide this information onboard the remote vehicle 1206.

At 1308, a communication link between the remote vehicle 1206 and the lead vehicle 1204 is established. As described above, because the link command message includes the correct identifying information, the remote vehicle 1206 that received and examined the identifying information can be communicatively linked with the lead vehicle 1204 in order to be remotely controlled by the lead vehicle 1204 without an operator having to travel to and go onboard the remote vehicle 1206. The examination of the link command message and the establishment of the communication link at 1306 and 1308 can be performed for each of the remote vehicles 1206 (or at least one or more of the remote vehicles 1206) that is included in the vehicle consist 1202.

At 1310, the remote vehicle 1206 that is communicatively linked with the lead vehicle 1204 operates according to operational command messages communicated from the lead vehicle 1204. For example, the lead vehicle 1204 may broadcast operational command messages that include operational settings (e.g., throttle settings, brake settings, or the like) for the remote vehicles 1206 in the vehicle consist 1202. The operational command messages may be received by remote vehicles 1206 that are included in the vehicle consist 1202 and by other remote vehicles that are not included in the vehicle consist 1202. The remote vehicles 1206 that are in the vehicle consist 1202 are communicatively linked with the lead vehicle 1204 and use the operational settings in the received operational command messages to control movement of the remote vehicles 1206. The remote vehicles that are not in the vehicle consist 1202 are not communicatively linked with the lead vehicle 1204 and disregard the operational command messages.

In one embodiment, an operator onboard the lead vehicle 1204 may initiate a test message to verify that the remote vehicles 1206 are communicatively linked with the lead vehicle 1204 prior to the lead vehicle 1204 remotely controlling movement of the remote vehicles 1206. For example, the lead vehicle 1204 may reduce fluid pressure in a brake system of the vehicle system (e.g., reduce the air pressure in an air brake pipe). This reduction in fluid can propagate through one or more conduits to the brake pipes in the remote vehicles 1206. The remote vehicles 1206 can communicate the reduction in pressure in the brake pipes and/or the rate at which fluid (e.g., air) is flowing through the brake pipes to the lead vehicle 1204. The lead vehicle 1204 can use the communicated reduction in pressure and/or airflow from the remote vehicles 1206 as confirmation that the remote vehicles 1206 are communicatively linked with the lead vehicle 1204. If no such reduction in pressure and/or airflow from a remote vehicle 1206 is received at the lead vehicle 1204, then the lead vehicle 1204 can determine that the remote vehicle 1206 is not communicatively linked with the lead vehicle 1204. Alternatively, the test message may be initiated automatically (e.g., without operator action). For example, following an attempted linking of the lead and remote vehicles, the control unit 1502 and/or communication unit 1510 can automatically direct the brake system to reduce the fluid pressure as the test message.

Returning to the description of the determination made at 1306, if the link command message does not include the correct identifying information, then flow of the method 1300 proceeds to 1312. At 1312, a communication link is not established between the remote vehicle (that received the link command message having the incorrect identifying information) and the lead vehicle 1204. For example, because the remote vehicle is not in the vehicle consist 1202, the remote vehicle may have a different vehicle identifier and/or consist identifier that does not match the identifying information in the link command message. As a result, the remote vehicle 1206 is not communicatively linked with the lead vehicle 1204.

At 1314, the remote vehicle disregards operational command messages received from the lead vehicle 1204. For example, because the link command message did not include identifying information that corresponded to the remote vehicle, the remote vehicle disregards operational command messages received from the lead vehicle 1204.

As described herein, the method 1300 may be used to establish communication links between the vehicles 1204, 1206 in the vehicle consist 1202 without an operator having to travel to and board the remote vehicles 1206. In another embodiment, however, the vehicles 1204, 1206 can be communicatively linked with a process that involves the operator traveling to the remote vehicles 1206. The method 1300 can save time in setting up the vehicle consist 1202 by potentially eliminating the need for an operator to travel to and board the remote vehicles 1206 to set up the remote vehicles 1206 for DP operations. Additionally, the method 1300 can reduce human error by reducing the number of times that the operator has to enter the identifying information into control units, memories, or the like, of the vehicles 1204, 1206. Human error of this type can result in communication link failures and additional time required to diagnose the failures and then to properly set up the vehicles 1204, 1206.

Figure 14:
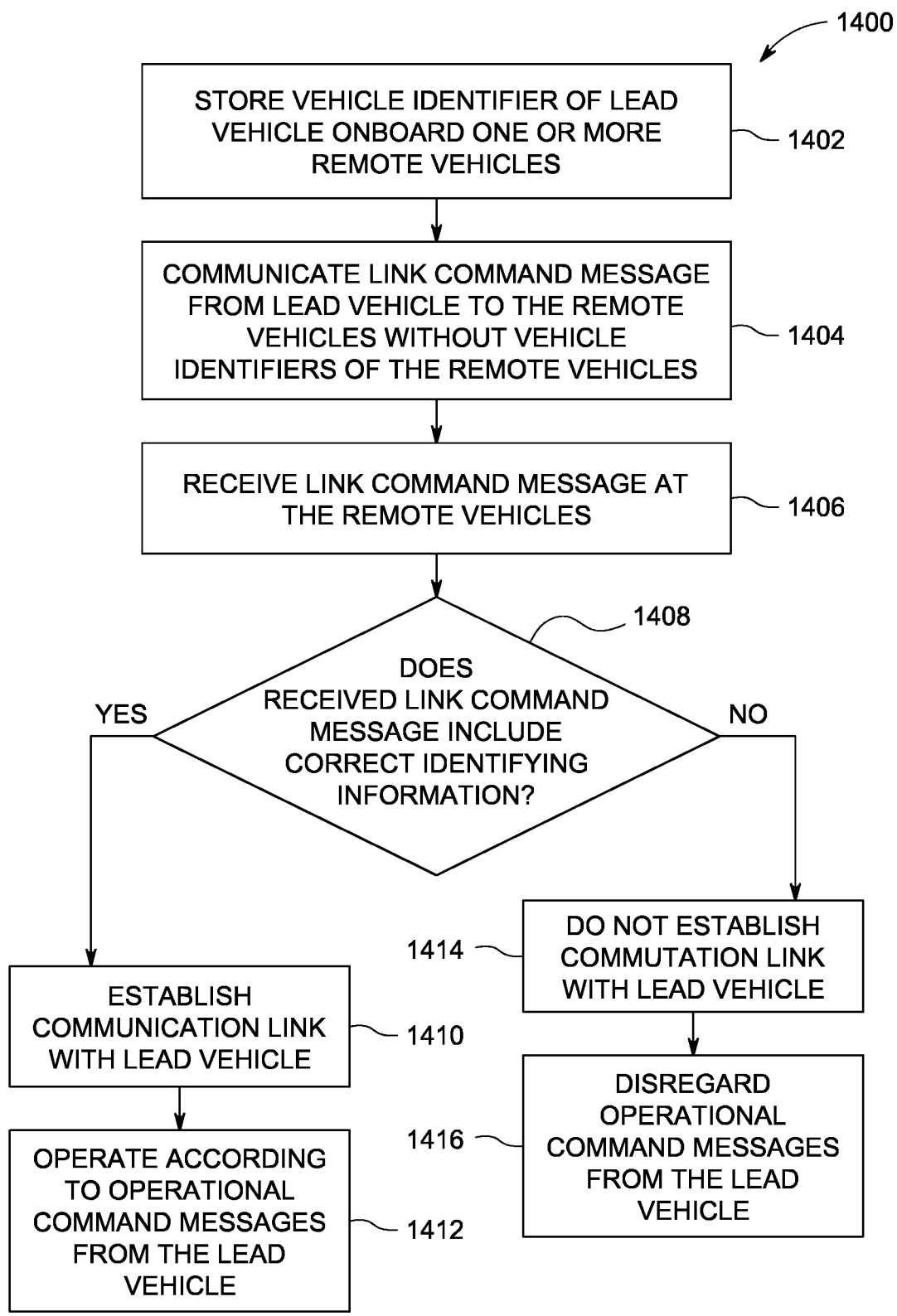
FIG. 14 illustrates a flowchart of another embodiment of a method for communicatively coupling vehicles in the vehicle consist shown in FIG. 12.

FIG. 14 illustrates a flowchart of another embodiment of a method 1400 for communicatively coupling vehicles 1204, 1206 in the vehicle consist 1202 shown in FIG. 12. The method 1400 may be used to establish communication links between the vehicles 1204, 1206 so that the lead vehicle 1204 can coordinate tractive efforts and/or braking efforts provided by the vehicles 1206. For example, the method 1400 may be used to set up the vehicles 1204, 1206 to operate in the DP mode.

At 1402, a vehicle identifier of the lead vehicle 1204 is provided to one or more (or all) of the remote vehicles 1206. For example, an operator can travel to and go onboard the remote vehicles 1206 and input the vehicle identifier of the lead vehicle 1204 into control units, memories, or the like, of the remote vehicles 1206. The remote vehicles 1206 can store the vehicle identifier in the onboard memories, control units, or the like. Alternatively, the vehicle identifier of the lead vehicle 1204 may be communicated to the remote vehicles 1206, such as by communicating the vehicle identifier via, over, through, or otherwise using one or more conductive pathways that connect the lead vehicle 1204 and the remote vehicles 1206 (e.g., a multiple unit cable, train line, brake line, or other cable or bus) or wirelessly communicating the vehicle identifier. The vehicle identifier of the lead vehicle 1204 that is provided to the remote vehicle 1206 can be referred to as a stored vehicle identifier, a designated vehicle identifier, a lead vehicle identifier, or the like. Optionally, the vehicle identifier may be automatically communicated to the remote vehicles 1206, such as by the control unit 1502 and/or communication unit 1510 sending the vehicle identifiers without any action on the part of the operator.

At 1404, a link command message is communicated to the remote vehicles 1206. The link command message may be broadcast from the lead vehicle 1204 to the remote vehicles 1206. Alternatively, the link command message may be communicated from another source, such as a tower, a dispatch center, a remote control device (e.g., an operator control unit), or the like. The link command message can be wirelessly transmitted and/or broadcast. Prior to communicating the link command message, the vehicles 1204, 1206 may not be communicatively coupled. For example, the vehicles 1206 may not be set up to operate according to operational command messages received from the lead vehicle 1204. The link command message includes the vehicle identifier of the lead vehicle 1204. For example, in contrast to the link command message communicated at 1302 in the flowchart of the method 1300 shown in FIG. 13, the link command message that is communicated to the remote vehicles 1206 at 1404 may include the vehicle identifier of the lead vehicle 1204, but not of the remote vehicles 1206.

At 1406, the link command message is received at the remote vehicles 1206. As described above, the link command message may be received by the remote vehicles 1206 that are to be included in the vehicle consist 1202 and one or more other remote vehicles that are not to be included in the vehicle consist 1202.

At 1408, the link command message is examined to determine if the link command message includes correct identifying information. For example, in response to receiving the link command message at a remote vehicle 1206, the remote vehicle 1206 can parse the link command message to determine if the link command message includes the vehicle identifier of the lead vehicle 1204. The vehicle identifier that is included in and/or received at the remote vehicle 1206 via the link command message may be referred to as a received vehicle identifier.

The remote vehicle 1206 can compare the received vehicle identifier from the link command message with the stored vehicle identifier that previously was provided to the remote vehicle 1206 at 1402. If the received vehicle identifier and the stored vehicle identifier represent the same lead vehicle 1204, then the remote vehicle 1206 can determine that the remote vehicle 1206 can communicatively link with the lead vehicle 1204 to receive operational command messages from the lead vehicle 1204. As a result, flow of the method 1400 can proceed to 1410. On the other hand, if the received vehicle identifier does not match the stored vehicle identifier, then the remote vehicle 1206 can determine that the remote vehicle 1206 cannot communicatively link with the lead vehicle 1204 to receive operational command messages from the lead vehicle 1204. As a result, flow of the method 1400 can proceed to 1414. The determination performed at 1408 can be performed onboard each of the remote vehicles 1206 without an operator being onboard the remote vehicles 1206. For example, after the stored vehicle identifier is provided to the remote vehicles 1206, the operator can return to the lead vehicle 1204 to cause the lead vehicle 1204 to communicate the link command message while the operator remains onboard the lead vehicle 1204 and/or does not go back onboard one or more of the remote vehicles 1206.

At 1410, a communication link between the remote vehicle 1206 and the lead vehicle 1204 is established. The examination of the link command message and the establishment of the communication link at 1408 and 1410 can be performed for each of the remote vehicles 1206 (or at least one or more of the remote vehicles 1206) that is included in the vehicle consist 1202. At 1412, the remote vehicle 1206 that is communicatively linked with the lead vehicle 1204 operates according to operational command messages communicated from the lead vehicle 1204. For example, the lead vehicle 1204 may broadcast operational command messages that include operational settings (e.g., throttle settings, brake settings, or the like) for the remote vehicles 1206 in the vehicle consist 1202. The operational command messages may be received by remote vehicles 1206 that are included in the vehicle consist 1202 and by other remote vehicles that are not included in the vehicle consist 1202. The remote vehicles 1206 that are in the vehicle consist 1202 are communicatively linked with the lead vehicle 1204 and use the operational settings in the received operational command messages to control movement of the remote vehicles 1206. The remote vehicles that are not in the vehicle consist 1202 are not communicatively linked with the lead vehicle 1204 and disregard the operational command messages.

In one embodiment, an operator onboard the lead vehicle 1204 may initiate a test message to verify that the remote vehicles 1206 are communicatively linked with the lead vehicle 1204 prior to the lead vehicle 1204 remotely controlling movement of the remote vehicles 1206. For example, the lead vehicle 1204 may reduce fluid pressure in a brake system of the vehicle system (e.g., reduce the air pressure in an air brake pipe). This reduction in fluid can propagate through one or more conduits to the brake pipes in the remote vehicles 1206. The remote vehicles 1206 can communicate the reduction in pressure in the brake pipes and/or the rate at which fluid (e.g., air) is flowing through the brake pipes to the lead vehicle 1204. The lead vehicle 1204 can use the communicated reduction in pressure and/or airflow from the remote vehicles 1206 as confirmation that the remote vehicles 1206 are communicatively linked with the lead vehicle 1204. If no such reduction in pressure and/or airflow from a remote vehicle 1206 is received at the lead vehicle 1204, then the lead vehicle 1204 can determine that the remote vehicle 1206 is not communicatively linked with the lead vehicle 1204. Alternatively, the test message may be initiated automatically, as described herein.

Returning to the description of the determination made at 1408, if the received vehicle identifier and the stored vehicle identifier do not represent the lead vehicle 1204 (e.g., if the received vehicle identifier does not match or otherwise correspond with the stored vehicle identifier), then flow of the method 1400 proceeds to 1414. At 1414, a communication link is not established between the remote vehicle (that received the link command message having the received vehicle identifier that does not match or otherwise correspond with the stored vehicle identifier) and the lead vehicle 1204. For example, because the remote vehicle is not in the vehicle consist 1202, the remote vehicle may have a different stored vehicle identifier than the vehicle identifier in the link command message. As a result, the remote vehicle 1206 is not communicatively linked with the lead vehicle 1204.

At 1416, the remote vehicle disregards operational command messages received from the lead vehicle 1204. For example, because the link command message did not include the vehicle identifier that matches the stored vehicle identifier, the remote vehicle disregards operational command messages received from the lead vehicle 1204.

As described herein, the method 1400 can reduce human error by reducing the number of times that the operator has to enter the identifying information into control units, memories, or the like, of the vehicles 1204, 1206. Human error of this type can result in communication link failures and additional time required to diagnose the failures and then to properly set up the vehicles 1204, 1206.

Figure 15:
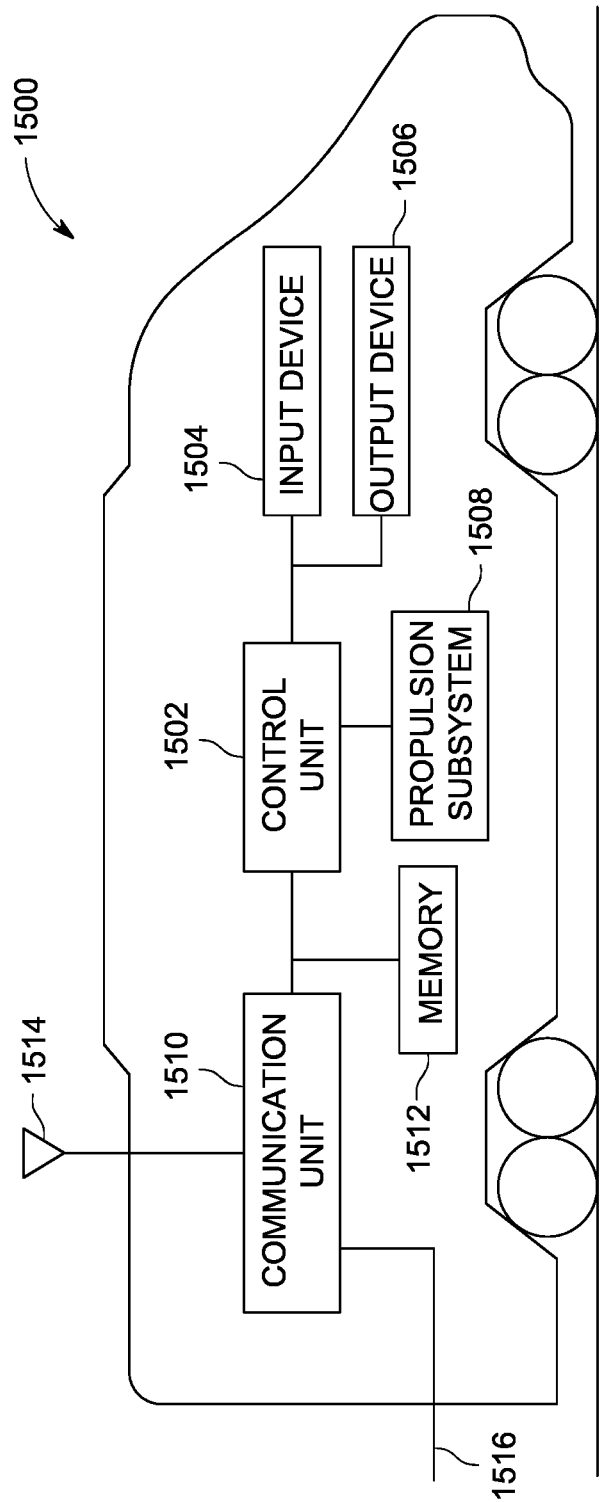
FIG. 15 is a schematic diagram of a propulsion-generating vehicle in accordance with one embodiment.

FIG. 15 is a schematic diagram of a propulsion-generating vehicle 1500 in accordance with one embodiment. The vehicle 1500 may represent one or more of the vehicles 1204, 1206 shown in FIG. 12. The vehicle 1500 includes a communication system that includes a control unit 1502 that controls operations of the vehicle 1500. The control unit 1502 can include or represent one or more hardware circuits or circuitry that include, are connected with, or that both include and are connected with one or more processors, controllers, or other hardware logic-based devices. The control unit 1502 is connected with an input device 1504 and an output device 1506. The control unit 1502 can receive manual input from an operator of the powered vehicle 1500 through the input device 1504, such as a touchscreen, keyboard, electronic mouse, microphone, or the like. For example, the control unit 1502 can receive manually input changes to the tractive effort, braking effort, speed, power output, and the like, from the input device 1504. The control unit 1502 can present information to the operator using the output device 1506, which can represent a display screen (e.g., touchscreen or other screen), speakers, printer, or the like. The control unit 1502 can be used by an operator to input information into the vehicle 1500, such as identifying information (e.g., stored vehicle identifiers, consist identifiers, orientations, or the like).

The control unit 1502 can compare identifying information received via a link command message with identifying information stored onboard the vehicle 1500 (e.g., in a memory 1512 described below). For example, in a remote vehicle 1206, the control unit 1502 can compare a vehicle identifier received in a link command message with the vehicle identifier of the remote vehicle 1206 to determine if the remote vehicle 1206 can communicatively link with the lead vehicle 1206. As another example, the control unit 1502 can compare a consist identifier received in a link command message with the consist identifier stored in the remote vehicle 1206 to determine if the remote vehicle 1206 can communicatively link with the lead vehicle 1206. As another example, the control unit 1502 can compare a vehicle identifier received in a link command message with the stored vehicle identifier of the lead vehicle 1206 that is stored onboard the remote vehicle 1206 to determine if the remote vehicle 1206 can communicatively link with the lead vehicle 1206.

If the identifying information matches the information stored onboard the remote vehicle (as described above), the control unit 1502 can establish a communication link with the lead vehicle 1206. For example, the control unit 1502 can begin receiving and operating according to operational command messages received from the lead vehicle 1204 via the communication unit 1510.

The control unit 1502 is connected with a propulsion subsystem 1508 of the powered vehicle 1500. The propulsion subsystem 1508 provides tractive effort and/or braking effort of the powered vehicle 1500. The propulsion subsystem 1508 may include or represent one or more engines, motors, alternators, generators, brakes, batteries, turbines, and the like, that operate to propel the powered vehicle 1500 under the manual or autonomous control that is implemented by the control unit 1500. For example, the control unit 1500 can generate control messages autonomously or based on manual input that is used to direct operations of the propulsion subsystem 1508.

The control unit 1502 also is connected with the communication unit 1510 and the memory 1512 of the communication system in the powered vehicle 1500. The memory 1512 can represent an onboard device that electronically and/or magnetically stores data. For example, the memory 1512 may represent a computer hard drive, random access memory, read-only memory, dynamic random access memory, an optical drive, or the like.

The communication unit 1510 includes or represents hardware and/or software that is used to communicate with other vehicles 1500 in the vehicle consist 1202. For example, the communication unit 1510 may include a transceiver 1514 and associated circuitry for wirelessly communicating (e.g., communicating and/or receiving) command messages described above. Additionally or alternatively, the communication unit 1510 include circuitry for communicating messages over a wired connection 1516, such as a multiple unit (eMU) line of the vehicle consist 1202 or another conductive pathway between or among the powered vehicles 1204, 1206, 1500 in the vehicle consist 1202. The control unit 1502 may control the communication unit 1510 by activating the communication unit 1510 (as described above). The communication unit 1510 can examine the messages that are received by the powered unit 1500 as described above. For example, the communication unit 1510 of a remote vehicle 1206 can examine received command messages to determine the directive sent by the lead vehicle 1204. The directive can be conveyed to the control unit 1502, which then implements the directive by creating control messages that are communicated to the propulsion subsystem 1508 for autonomous control or by presenting the directive to the operator on the output device 1506 for manual implementation of the directive. The communication unit 1510 can examine received messages sent by other vehicles 1204, 1206 to determine the identifying information in the messages. The communication unit 1510 can store the received vehicle identifiers and other information and statuses in the memory 1512.

In one embodiment, a method (e.g., for establishing a communication link between vehicles) includes receiving a link command message at a first remote vehicle in a vehicle consist having a lead vehicle and at least the first remote vehicle. The link command message can include identifying information representative of at least one of a designated vehicle consist and/or one or more designated remote vehicles. The method also can include comparing, onboard the first remote vehicle, the identifying information of the link command message with one or more of a stored consist identifier or a stored vehicle identifier stored onboard the first remote vehicle and establishing a communication link between the lead vehicle and the first remote vehicle responsive to the identifying information of the link command message matching the one or more of the stored consist identifier or the stored vehicle identifier.

In one aspect, the identifying information can include one or more of a unique vehicle identifier of the first remote vehicle or a unique consist identifier of the vehicle consist.

In one aspect, the identifying information in the link command message can include both the vehicle identifier and the consist identifier. The communication link can be established responsive to both the vehicle identifier in the link command message matching the stored vehicle identifier and the consist identifier matching the stored consist identifier.

In one aspect, the method also can include controlling movement of the first remote vehicle based on an operational command message received at the first remote vehicle from the lead vehicle over the communication link that is established where, prior to establishing the communication link, the first remote vehicle disregards the operational command message received from the lead vehicle.

In one aspect, the link command message also can include an orientation identification of the first remote vehicle relative to the lead vehicle.

In one aspect, the vehicle consist can include the lead vehicle and the at least the first remote vehicle mechanically separate from each other during remote control of movement of the at least the first remote vehicle by the lead vehicle.

In one aspect, the link command message can be communicated from the lead vehicle.

In another embodiment, a system (e.g., a communication system) includes a remote communication unit and a control unit. The remote communication unit can be configured to receive a link command message at a first remote vehicle in a vehicle consist having a lead vehicle and at least the first remote vehicle. The link command message can include identifying information representative of at least one of a designated vehicle consist and/or one or more designated remote vehicles. The control unit can be configured to be disposed onboard the first remote vehicle and to compare the identifying information of the link command message with one or more of a stored consist identifier and/or a stored vehicle identifier stored onboard the first remote vehicle. The control unit also can be configured to establish a communication link between the lead vehicle and the first remote vehicle responsive to the identifying information of the link command message matching the one or more of the stored consist identifier or the stored vehicle identifier.

In one aspect, the identifying information can include one or more of a unique vehicle identifier of the first remote vehicle or a unique consist identifier of the vehicle consist.

In one aspect, the identifying information in the link command message can include both the vehicle identifier and the consist identifier. The control unit can be configured to establish the communication link responsive to both the vehicle identifier in the link command message matching the stored vehicle identifier and the consist identifier matching the stored consist identifier.

In one aspect, the control unit can be configured to control movement of the first remote vehicle based on an operational command message received at the first remote vehicle from the lead vehicle over the communication link. Prior to establishing the communication link, the control unit can disregard the operational command message received from the lead vehicle.

In one aspect, the link command message also can include an orientation identification of the first remote vehicle relative to the lead vehicle.

In one aspect, the vehicle consist can include the lead vehicle and the at least the first remote vehicle mechanically separate from each other during remote control of movement of the at least the first remote by the lead vehicle.

In one aspect, the communication unit can be configured to receive the link command message from the lead vehicle.

In another embodiment, a system (e.g., a communication system) includes a control unit and a remote communication unit. The control unit can be configured to be disposed onboard a remote vehicle in a vehicle consist having a first lead vehicle and at least the remote vehicle. The control unit also can be configured to obtain a lead vehicle identifier representative of the first lead vehicle. The remote communication unit can be configured to be disposed onboard the remote vehicle and to receive a link command message that includes identifying information representative of a designated lead vehicle. The control unit can be configured to compare the identifying information of the link command message with the lead vehicle identifier and to establish a communication link between the first lead vehicle and the remote vehicle responsive to the identifying information of the link command message matching the lead vehicle identifier.

In one aspect, the lead vehicle identifier can be a unique vehicle identifier of the first lead vehicle.

In one aspect, the control unit can be configured to control movement of the remote vehicle based on an operational command message received at the remote vehicle from the first lead vehicle over the communication link that is established. Prior to establishing the communication link, the control unit can be configured to disregard the operational command message received from the first lead vehicle.

In one aspect, the link command message also can include an orientation identification of the remote vehicle relative to the first lead vehicle.

In one aspect, the vehicle consist can include the first lead vehicle and the at least the remote vehicle mechanically coupled with each other.

In another embodiment, a system (e.g., a communication system) includes a communication unit and a control unit. The communication unit can be configured to be disposed on one of onboard a lead vehicle of a vehicle consist having the lead vehicle and plural remote vehicles or off-board the vehicle consist. The control unit can be configured to be disposed on said one of onboard the lead vehicle or off-board the vehicle consist and to control the communication unit to transmit plural link command messages to the plural remote vehicles. Each of the link command messages can include identifying information representative of at least one of a designated vehicle consist and/or one or more designated remote vehicles. The control unit also can be configured to automatically establish one or more communication links with the remote vehicles responsive to the identifying information in the link command messages matching one or more of a stored consist identifier and/or a stored vehicle identifier stored onboard the remote vehicles.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose message processor, microcontroller, random access memory, hard disk, and the like). Similarly, the programs may be standalone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

The invention claimed is:

1. A method comprising:
communicating a first identity of a first lead vehicle of a vehicle consist to a remote vehicle of the vehicle consist;
controllably linking the first lead vehicle with the remote vehicle responsive to the first identity corresponding to a designated identity, the remote vehicle allowing the first vehicle to remotely control operation of the remote vehicle during a time period that the first lead and remote vehicles are controllably linked;
communicating a replacement identity of a second lead vehicle that is to be coupled with the vehicle consist to the remote vehicle; and
communicating a second identity of the second lead vehicle to the remote vehicle, wherein the remote vehicle and the second lead vehicle are controllably linked responsive to the second identity corresponding to the replacement identity, and wherein the remote vehicle allows the second lead vehicle to remotely control the operation of the remote vehicle when the second lead vehicle and the remote vehicle are controllably linked.

2. The method of claim 1, wherein the remote vehicle prevents the second lead vehicle from remotely controlling the operation of the remote vehicle during a time period that the remote vehicle and the second lead vehicle are not controllably linked.

3. The method of claim 1, further comprising:
confirming that the second lead vehicle can control the operations of the remote vehicle by comparing the second identity to the replacement identity that is received onboard the remote vehicle; and
communicating a confirmation signal from the remote vehicle to the second lead vehicle responsive to the second identity corresponding to the replacement identity.

4. The method of claim 1, wherein at least one of communicating the first identity, communicating the replacement identity, or communicating the second identity occurs over a wireless connection between the remote vehicle and one or more of the first lead vehicle or the second lead vehicle.

5. The method of claim 1, wherein at least one of communicating the first identity, communicating the replacement identity, or communicating the second identity occurs over a wired connection between the remote vehicle and one or more of the first lead vehicle or the second lead vehicle.

6. The method of claim 1, further comprising storing the replacement identity in a memory disposed onboard the remote vehicle so that the replacement identity can be compared to the second identity after the second identity is received.

7. The method of claim 1, wherein the remote vehicle and the second lead vehicle are controllably linked in a distributed power system responsive to the second identity corresponding to the replacement identity.

8. A method comprising:
receiving a linking signal from a first lead vehicle of a vehicle consist at a remote vehicle of the vehicle consist, the linking signal including a first identity of the first lead vehicle;
controllably linking the remote vehicle with the first lead vehicle responsive to the first identity corresponding to a designated identity, the remote vehicle allowing the first lead vehicle to remotely control operation of the remote vehicle during a time period that the first lead vehicle and the remote vehicle are controllably linked;
receiving a replacement identity of a vehicle other than the first lead vehicle at the remote vehicle;
receiving a second identity of a second lead vehicle at the remote vehicle; and
controllably linking the remote vehicle with the second lead vehicle responsive to the second identity of the second lead vehicle corresponding to the replacement identity, wherein the remote vehicle allows the second lead vehicle to remotely control the operation of the remote vehicle responsive to the second lead vehicle and the remote vehicle being controllably linked.

9. The method of claim 8, further comprising comparing the second identity with the replacement identity, wherein controllably linking the remote vehicle with the second lead vehicle occurs responsive to the second identity corresponding to the replacement identity.

10. The method of claim 8, further comprising storing the replacement identity in a memory disposed onboard the remote vehicle.

11. The method of claim 8, wherein the remote vehicle and the second lead vehicle are controllably linked in a distributed power system responsive to the second identity corresponding to the replacement identity.

12. The method of claim 8, wherein the replacement identity notifies the remote vehicle that the first lead vehicle is to be mechanically decoupled from the vehicle consist.

13. A method comprising:
in a vehicle consist having plural vehicles, communicating a first identity from a lead vehicle to a remote vehicle;
controllably linking the remote vehicle with the lead vehicle responsive to the first identity corresponding to a designated identity, the remote vehicle allowing the lead vehicle to remotely control operation of the remote vehicle during a time period that the lead vehicle and the remote vehicle are controllably linked;
communicating a replacement identity from the lead vehicle to the remote vehicle; and
determining which of the vehicles in the vehicle consist can remotely control the operation of the remote vehicle based on the replacement identity.

14. The method of claim 13, wherein the vehicles of the vehicle consist are controllably linked with each other in a distributed power system responsive to the remote vehicle verifying that the lead vehicle can control the operation of the remote vehicle.

15. The method of claim 13, wherein communicating the replacement identity occurs over a wireless connection between the remote vehicle and the lead vehicle.

16. The method of claim 13, wherein communicating the replacement identity occurs over a wired connection between the remote vehicle and the lead vehicle.

17. The method of claim 13, wherein at least one of the vehicles other than the lead vehicle can control the operation of the remote vehicle only during a time period that the replacement identity corresponds to a second identity of the at least one of the vehicles.

18. The method of claim 13, wherein communicating the first identity includes transmitting a linking signal that includes the first identity from the lead vehicle to the remote vehicle.

19. The method of claim 13, wherein communicating the replacement identity includes transmitting a de-linking signal that includes the replacement identity from the lead vehicle to the remote vehicle.

20. The method of claim 13, further comprising preventing one or more of the vehicles from remotely controlling the operation of the remote vehicle responsive to one or more identities of the one or more vehicles not matching the replacement identity.

* * * * *